(12) United States Patent
Van Dyke et al.

(10) Patent No.: US 9,825,320 B2
(45) Date of Patent: Nov. 21, 2017

(54) PROCESS FOR THE MANUFACTURE OF MEMBRANE ELECTRODE UNITS

(71) Applicant: BASF SE, Ludwigshafen (DE)

(72) Inventors: Andrew Van Dyke, Bridgewater, NJ (US); William Smith, Westfield, NJ (US)

(73) Assignee: BASF SE, Ludwigshafen (DE)

( * ) Notice: Subject to any disclaimer, the term of this patent is extended or adjusted under 35 U.S.C. 154(b) by 207 days.

(21) Appl. No.: 14/784,786

(22) PCT Filed: Apr. 8, 2014

(86) PCT No.: PCT/IB2014/000515
§ 371 (c)(1),
(2) Date: Oct. 15, 2015

(87) PCT Pub. No.: WO2014/170733
PCT Pub. Date: Oct. 23, 2014

(65) Prior Publication Data
US 2016/0087299 A1    Mar. 24, 2016

Related U.S. Application Data

(60) Provisional application No. 61/812,268, filed on Apr. 16, 2013.

(51) Int. Cl.
*H01M 8/10*     (2016.01)
*H01M 8/1004*   (2016.01)
*H01M 8/103*    (2016.01)
*H01M 8/0273*   (2016.01)
*H01M 8/0284*   (2016.01)
*H01M 8/04082*  (2016.01)
(Continued)

(52) U.S. Cl.
CPC ....... *H01M 8/1004* (2013.01); *H01M 8/0273* (2013.01); *H01M 8/0284* (2013.01); *H01M 8/04201* (2013.01); *H01M 8/103* (2013.01); *H01M 8/1023* (2013.01); *H01M 8/1067* (2013.01); *H01M 2008/1095* (2013.01); *H01M 2300/0082* (2013.01); *Y02P 70/56* (2015.11)

(58) Field of Classification Search
None
See application file for complete search history.

(56) References Cited

U.S. PATENT DOCUMENTS 5,464,700 A   11/1995   Steck et al.
5,738,905 A    4/1998   Bevers
(Continued)

FOREIGN PATENT DOCUMENTS

CN   1612391 A   5/2005
CN   1735988 A   2/2006
(Continued)

OTHER PUBLICATIONS

International Search Report for PCT/IB2014/000515 dated Jan. 6, 2015.

*Primary Examiner* — Scott J Chmielecki
(74) *Attorney, Agent, or Firm* — Drinker Biddle & Reath LLP

(57) ABSTRACT

A process for manufacturing membrane electrode units (MEU) for fuel cell is disclosed, said MEU have two electrochemically active electrodes which are separated by a polymer electrolyte membrane.

35 Claims, 17 Drawing Sheets

Illustration of placing the second polymer sheet

A second Polymer sheet, e.g. ®Kapton, (Part D) is placed onto the shim frame (Part E) and alignment pins (Part C)

(51) Int. Cl.
  *H01M 8/1023* (2016.01)
  *H01M 8/1018* (2016.01)
  *H01M 8/1067* (2016.01)

(56) References Cited

U.S. PATENT DOCUMENTS

| | | | |
|---|---|---|---|
| 5,761,793 | A | 6/1998 | Bevers et al. |
| 6,103,077 | A | 8/2000 | DeMarinis et al. |
| 6,940,156 | B2 | 9/2005 | Bauer et al. |
| 6,979,383 | B2 | 12/2005 | Yandrasits et al. |
| 7,229,553 | B2 | 6/2007 | Uensal et al. |
| 7,285,325 | B2 | 10/2007 | Soczka-Guth et al. |
| 7,462,223 | B2 | 12/2008 | Kiefer et al. |
| 7,534,517 | B2 | 5/2009 | Hiroi et al. |
| 7,582,210 | B2 | 9/2009 | Calundann et al. |
| 2002/0106551 | A1 | 8/2002 | Speranza et al. |
| 2006/0014065 | A1 | 1/2006 | Pawlik et al. |
| 2008/0280182 | A1 | 11/2008 | Uensal et al. |
| 2011/0081591 | A1 | 4/2011 | Scherer et al. |
| 2011/0305966 | A1* | 12/2011 | Min .............. H01M 8/0247 429/457 |
| 2012/0005885 | A1* | 1/2012 | Kwok ............ H01M 8/247 29/760 |
| 2012/0122013 | A1* | 5/2012 | Schmidt ........ C08J 5/2256 429/481 |
| 2014/0060143 | A1* | 3/2014 | Son .............. H01M 8/1004 72/342.1 |

FOREIGN PATENT DOCUMENTS

| | | |
|---|---|---|
| CN | 101023546 A | 8/2007 |
| CN | 102067368 A | 5/2011 |
| DE | 19509748 A1 | 10/1996 |
| DE | 19509749 A1 | 10/1996 |
| DE | 19757492 A1 | 7/1999 |
| DE | 10235360 A1 | 2/2004 |
| DE | 10245451 A1 | 4/2004 |
| EP | 1337319 A1 | 8/2003 |
| EP | 1368845 A1 | 12/2003 |
| EP | 1373379 A2 | 1/2004 |
| EP | 1379573 A1 | 1/2004 |
| EP | 1425336 A2 | 6/2004 |
| WO | WO-92/15121 A1 | 9/1992 |
| WO | WO-96/13872 A1 | 5/1996 |
| WO | WO-00/26982 A2 | 5/2000 |
| WO | WO-00/44816 A1 | 8/2000 |
| WO | WO-01/18894 A2 | 3/2001 |
| WO | WO-02/36249 A1 | 5/2002 |
| WO | WO-02/071518 A1 | 9/2002 |
| WO | WO-02070592 A2 | 9/2002 |
| WO | WO-02/088219 A1 | 11/2002 |
| WO | WO-03/016384 A2 | 2/2003 |
| WO | WO-2006/008158 A2 | 1/2006 |

\* cited by examiner

Illustration of placing the base

Plastic base (Part A) with holes for alignment pins (Parts C)

Illustration placing of the tray.

Tray (Part B) with matching alignment holes is placed on base (Part A)

Illustration of placing the alignment tooling pins

Alignment pins (Parts C) are inserted through tray (Part B) and into Base (Part A)

Illustration of placing the first polymer sheet

Polymer sheet, e.g. ®Kapton, (Part D) is placed onto tray (Part B) and alignment pins (Part C)

Illustration of placing the shim frame

Shim frame (Part E) is placed onto Polymer sheet, e.g. ®Kapton, (Part D) and alignment pins (Part C)

Illustration of placing the first gas diffusion layer

Gas Diffusion Layer (Part F) is placed into shim frame (Part E).

Illustration of placing the first polymer frame subgasket

First polymer subgasket (Part G) is placed onto GDE and alignment pins (Part C)

Illustration of placing the cutting plate

Cutting plate (Part H) is placed onto polymer subgasket (Part G) and alignment pins (Part C)

Illustration of a sample design of a cutting plate showing slots, hardstops and ramps Illustration of placing the polymer electrolyte membrane Oversized polymer electrolyte membrane (Part I) is placed over window of cutting plate (Part H)

Illustration of placing the alignment cutting die

Alignment cutting die (Part J) is placed onto alignment pins (Part C)

Illustration of removing the cutting plate

Outer trimmed area of polymer electrolyte membrane (Part I) is removed, then cutting plate (Part H) is removed Illustration of placing the second polymer frame subgasket Second polymer frame subgasket (Part G) is placed onto polymer electrolyte membrane (Part I) and alignment pins (Part C)

Illustration of the second shim frame with optional reservoirs in the shim frame Second shim frame (Part E) is placed onto the second polymer subgasket (Part G) and alignment pins (Part C)

Illustration of placing the second gas diffusion layer

Second Gas Diffusion Layer (Part K) is placed into the shim frame (Part E) window Illustration of placing the second polymer sheet A second Polymer sheet, e.g. ®Kapton, (Part D) is placed onto the shim frame (Part E) and alignment pins (Part C)

Test results for 605cm2 MEAs prepared with new One Shot Assembly (OSA) method and traditional Labor Intensive Assembly (LIA) method.

Figure 17 shows the performance of an MEA (605cm$^2$ MEA) prepared with One Shot Assembly (OSA) method according to the invention and an MEA prepared with Std LIA method. The performance is nearly identical for the duration of the test.

PROCESS FOR THE MANUFACTURE OF MEMBRANE ELECTRODE UNITS

CROSS-REFERENCE TO RELATED APPLICATIONS

This application is a national stage application (under 35 U.S.C. §371) of PCT/IB2014/000515, filed Apr. 8, 2014, which claims benefit of U.S. Application No. 61/812,268, filed Apr. 16, 2013, both of which are incorporated herein by reference in their entirety.

The present invention relates to a process for manufacturing membrane electrode units (MEU) for fuel cells, said MEU having two electrochemically active electrodes which are separated by a polymer electrolyte membrane.

In fuel cell technology, most polymer electrolyte membranes (PEM) are based on sulphonic acid-modified polymers/perfluorinated polymers are used, such as Nafion™ from DuPont de Nemours, Willmington, USA. For the conduction of protons, such polymer electrolyte membranes require relatively high water content in the membrane which typically amounts to 4-20 molecules of water per sulphonic acid group. The required water content, but also the stability of the polymer in connection with acidic water and the reaction gases hydrogen and oxygen, restricts the operating temperature of the PEM fuel cell stack to 80-100° C. Higher operating temperatures, e.g. operating pressurized, cannot be implemented without a decrease in performance of the fuel cell. At temperatures higher than the dew point of water for a given pressure level, the membrane dries out completely and the fuel cell provides no more electric power as the resistance of the membrane increases to such high values that an appreciable current flow no longer occurs.

A membrane electrode unit with integrated gasket based on the technology set forth above is described, for example, in U.S. Pat. No. 5,464,700. Here, in the outer area of the membrane electrode unit, films made of elastomers are provided on the surfaces of the membrane that are not covered by the electrode which simultaneously constitute the gasket to the bipolar plates and the outer space.

By means of this measure, savings on very expensive membrane material can be made up to 100° C. It is not possible to achieve higher working temperatures with elastomers. Therefore, the method described herein is not suitable for fuel cells with operating temperatures of more than 100° C.

Due to system-specific reasons, however, operating temperatures in the fuel cell of more than 100° C. are desirable. The activity of the catalysts based on noble metals and contained in the membrane electrode unit (MEU) is significantly improved at high operating temperatures. Especially when the so-called reformates from hydrocarbons are used, the reformer gas contains considerable amounts of carbon monoxide which usually have to be removed by means of an elaborate gas conditioning or gas purification process. The tolerance of the catalysts to the CO impurities is increased at high operating temperatures.

Furthermore, heat is produced during operation of fuel cells. However, the cooling of these systems to less than 80° C. can be very complex. Depending on the power output, the cooling devices can be constructed significantly less complex. This means that the waste heat in fuel cell systems that are operated at temperatures of more than 100° C. can be utilised distinctly better and therefore the efficiency of the fuel cell system can be increased.

To achieve these temperatures, in general, membranes with new conductivity mechanisms are used. One approach to this end is the use of membranes which show ionic conductivity without employing water. The first promising development in this direction is set forth in the document WO96/13872. However, this new class of polymer electrolyte membranes is different from the polymer electrolyte membranes based on sulphonic acid-modified polymers/perfluorinated polymers, such as Nafion™ as required different handling and manufacturing techniques.

In the art of MEU for high temperature fuel cells based on polymer electrolyte membranes (PEM) which can be operated above 100° C. without any humidification, the limited mechanical stability of the polymer electrolyte membranes (PEM) most typically required the use of so-called subgaskets or sophisticated gasket designs. To this end, two electrodes are pressed onto the membrane, each of which only covers part of the two main surfaces of the membrane. Most typically, a PTFE gasket is pressed onto the remaining exposed part of the main surfaces of the membrane in the cell such that the gas spaces of anode and cathode are sealed in respect to each other and the environment. However, it was found that a membrane electrode unit produced in such a way only exhibits high durability with very small cell surface areas of 1 $cm^2$. If bigger cells, in particular with a surface area of at least 10 $cm^2$, are produced, the durability of the cells at temperatures of more than 150° C. is limited to less than 100 hours.

Another high-temperature fuel cell is disclosed in document JP-A-2001-1960982. In this document, an electrode membrane unit is presented which is provided with a polyimide gasket. However, the problem with this structure is that for sealing two membranes are required between which a seal ring made of polyimide is provided. As the thickness of the membrane has to be chosen as little as possible due to technical reasons, the thickness of the seal ring between the two membranes described in JP-A-2001-196082 is extremely restricted. It was found in long-term tests that such a structure is likewise not stable over a period of more than 1000 hours.

Furthermore, DE 10235360 describes a membrane electrode unit that contains polyimide layers for sealing. However, these layers have a uniform thickness such that the boundary area is thinner than the area being in contact with the membrane. The membrane electrode units mentioned above are generally connected with planar bipolar plates which include channels for a flow of gas milled into the plates. As part of the membrane electrode units has a higher thickness than the gaskets described above, a gasket is inserted between the gasket of the membrane electrode units and the bipolar plates which is usually made of PTFE. To avoid such gasket more sophisticated bipolar plates are required which causes higher costs.

A first approach for an MEU having an improved sub-gasket design and related materials and manufacturing is described in WO 2006/008158. Here a portion of the sub-gasket acts as shim/hard-stop to avoid any over compression of the polymer electrolyte membrane being operational above 100° C. without any humidification. However, the manufacture of such MEU is still very complex and requires several steps in which semi-finished/intermediate components being individually manufactured and thereafter finally combined to produce the final MEU.

Therefore, it is an object of the present invention to provide a process for the manufacture of MEU employing polymer electrolyte membrane being operational above 100° C. without any humidification, which is providing MEU products having similar or improved performance using a less complex manufacturing process.

The MEU provided by such process should have the following properties:
(i) the cells should exhibit a long service life during operation at temperatures of more than 100° C.,
(ii) the individual cells should exhibit a consistent or improved performance at temperatures of more than 100° C. over a long period of time,
(iii) the fuel cells should have a high open circuit voltage as well as a low gas crossover after a long operating time,
(iv) it should be possible to employ the fuel cells in particular at operating temperatures of more than 100° C. and without additional fuel gas humidification,
(v) the membrane electrode units should in particular be able to resist permanent or alternating pressure differences between anode and cathode and
(iv) the membrane electrode unit should be produced in an easy way and less expensive.

Figure 1:
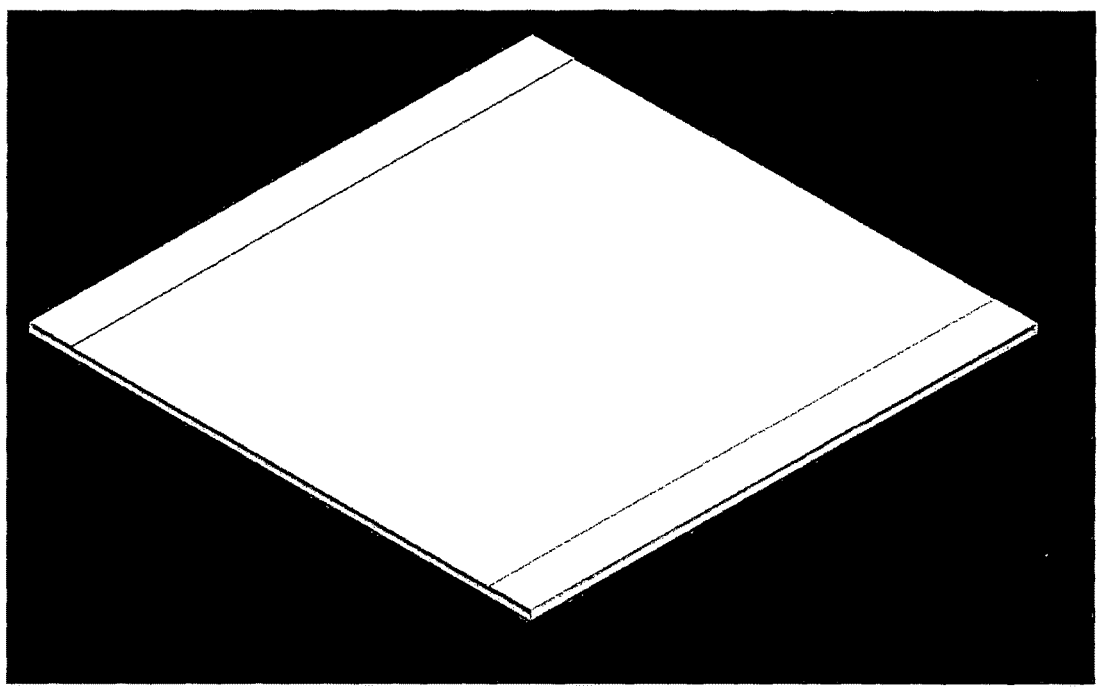
FIG. 1 is an illustration of placing the base.

It was now found that MEU employing polymer electrolyte membrane being operational above 100° C. without any humidification can be much easier produced by the process of the instant invention.

Thus the present invention relates to a process for the manufacture of a membrane electrode unit (MEU) having
(i) two gas diffusion layers that are each in contact with a catalyst layer and being separated by a polymer electrolyte membrane,
(ii) both surfaces of the polymer electrolyte membrane that is in contact with a catalyst layer are provided each with a polymer frame, each of said polymer frames having an inner area which is provided on the surfaces of the polymer electrolyte membrane, and an outer area which extends outwards and which is not provided on the surface of a gas diffusion layer, comprising the following steps
a) placing a base on which the manufacture is performed, said base having holes for placing an alignment tooling and said holes being arranged at least at the peripheral edges of the MEU being manufactured,
b) placing a tray with matching alignment tooling holes on top of the base provided in step a),
c) placing pins as alignment tooling in the alignment tooling holes, said pins insert through the holes of the tray into the base, said pins protrude rectangular of the base and tray,
d) placing a first polymer sheet with matching alignment tooling holes on top of the tray, said polymer sheet covering at least the entire area of the tray otherwise coming into contact with the two gas diffusion layer furnished later,
e) placing a first shim frame with matching alignment tooling holes on top of the polymer sheet provided in step d),
f) placing a first gas diffusion layer being in contact with a catalyst layer into the aperture formed by the shim frame provided in step e), said gas diffusion layer having the same size or a size being slightly smaller than the aperture size and form as the aperture and said catalyst layer facing upwards,
g) placing a first polymer frame subgasket with matching alignment tooling holes on top of the arrangement of step f), said polymer frame subgasket overlapping with the peripheral area of the gas diffusion layer/catalyst layer being and thereby creating an aperture being smaller that the aperture formed by the shim frame,
   said polymer frame subgasket having an outer area extending outwards and not being provided with the surface of a gas diffusion layer or polymer electrolyte membrane to be furnished later,
h) placing a cutting plate with matching alignment tooling holes on top of the arrangement of step g), said cutting plate having a frame shape and said frame having an aperture which is about 1 mm, preferably about 2 mm, smaller than the size of the polymer electrolyte membrane to be furnished subsequently,
i) placing the polymer electrolyte membrane over the aperture of the cutting frame, said membrane covering the entire aperture and overlapping the peripheral area of the aperture by at least about 1 mm, preferably at least about 2 mm,
j) placing an alignment cutting die with matching alignment tooling holes on top of the arrangement of step i), said cutting die having a cutting die at the peripheral area,
k) pressing the alignment cutting towards the polymer electrolyte membrane and cutting off thereby the area of the polymer electrolyte membrane extending outwards of the cutting die and removing the alignment cutting and polymer electrolyte membrane scrap,
l) removing the cutting plate and leaving the cut polymer electrolyte membrane overlapping with the peripheral area of the polymer frame subgasket,
m) placing a second polymer frame subgasket with matching alignment tooling holes on top of the arrangement of step l), said second polymer frame subgasket overlapping with the peripheral area of the polymer electrolyte membrane and thereby creating an aperture, said second polymer frame subgasket having an outer area extending outwards and not being provided with the surface of a second gas diffusion layer to be furnished later or polymer electrolyte membrane, n) placing a second shim frame with matching alignment tooling holes, said second shim frame overlaps with the peripheral area of the subgasket, leaving an inner area to which the gas diffusion layer will be bonded, preferably said overlap being about 1 mm to about 5 mm, in particular about 2 to about 5 mm, most preferred about 2 mm to 3 mm, o) placing a second gas diffusion layer being in contact with a catalyst layer into the aperture formed by the shim frame provided in step n), said gas diffusion layer having the same size or a size being slightly smaller than the aperture size and form as the aperture and said catalyst layer facing downwards towards the polymer electrolyte membrane, p) placing a second polymer sheet with matching alignment tooling holes on top of the tray, said polymer sheet covering at least the entire area of the second gas diffusion layer furnished in step o), q) removing the alignment tooling pins placed in step c) from the alignment tooling holes, r) pressing the arrangement from step q).

Polymer Electrolyte Membranes

For the purposes of the present invention, suitable polymer electrolyte membranes are known per se. In general, membranes are employed for this, which comprise acids, wherein the acids may be covalently bound to the polymers or imbibed and coordinated through acid-base interaction with the polymer forming the membrane. Thus any flat material being doped with an acid can be used as suitable membrane. These membranes can, amongst other methods, be produced by swelling flat materials, for example a polymer film, with a fluid comprising acidulous compounds, or by manufacturing a mixture of polymers and acidulous compounds and the subsequent formation of a membrane by forming a flat structure and following solidification in order to form a membrane.

Preferred polymers include, amongst others, polyolefines, such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes; polymers having C—O bonds in the backbone, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate;

Polymeric C—S-bounds in the backbone, for example, polysulphide ether, polyphenylenesulphide, polyethersulphone, polysulphone, polymeric C—N bonds in the backbone, for example polyimines, polyisocyanides, polyetherimine, polyetherimides, polyaniline, polyaramides, polyamides, polyhydrazides, polyurethanes, polyimides, polyazoles, polyazole ether ketone, polyazines; liquid crystalline polymers in particular Vectra as well as inorganic polymers, such as polysilanes, polycarbosilanes, polysiloxanes, polysilicic acid, polysilicates, silicons, polyphosphazenes and polythiazyl.

Preferred herein are alkaline polymers, wherein this particularly applies to membranes doped with acids. Almost all known polymer membranes that are able to transport protons come into consideration as alkaline polymer membranes doped with acid. Here, acids are preferred, which are able to transport the protons without additional water, for example by means of the so called Grotthus mechanism.

As alkaline polymer according to the present invention, preferably an alkaline polymer with at least one nitrogen atom in a repeating unit is used.

According to a preferred embodiment, the repeating unit in the alkaline polymer contains an aromatic ring with at least one nitrogen atom. The aromatic ring is preferably a five-membered or six-membered ring with one to three nitrogen atoms, which may be fused to another ring, in particular another aromatic ring.

According to one particular aspect of the present invention, high-temperature-stable polymers are used, which contain at least one nitrogen, oxygen and/or sulphur atom in one or in different repeating units.

Within the context of the present invention, a high-temperature-stable polymer is a polymer which, as polymer electrolyte, can be operated over the long term in a fuel cell at temperatures above 120° C. Over the long term means that a membrane according to the invention can be operated for at least 100 hours, preferably at least 500 hours, at a temperature of at least 80° C., preferably at least 120° C., particularly preferably at least 160° C., without the performance being decreased by more than 50% based on the initial performance, which can be measured according to the method described in WO 01/18894 A2.

The above mentioned polymers can be used individually or as a mixture (blend). Here, preference is given in particular to blends which contain polyazoles and/or polysulphones. In this context, the preferred blend components are polyethersulphone, polyether ketone, and polymers modified with sulphonic acid groups, as described in the European patent application EP-A-1,337,319 and German patent application DE-A-10245451. By using blends, the mechanical properties can be improved and the material costs can be reduced.

Polyazoles constitute a particularly preferred group of alkaline polymers. An alkaline polymer based on polyazole contains recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

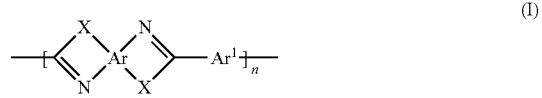

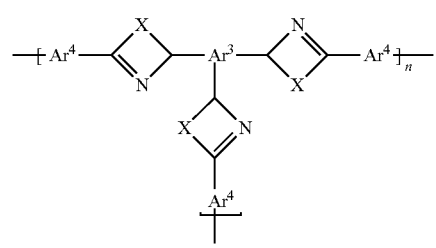 (III)
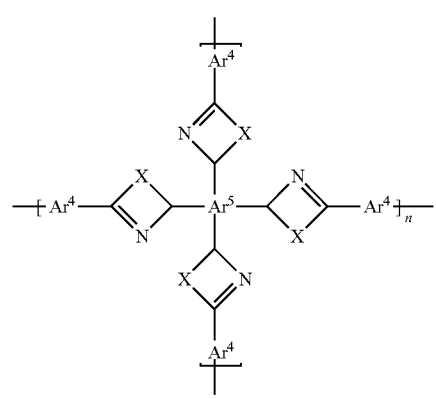 (IV)
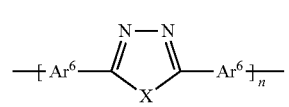 (V)
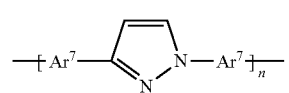 (VI)
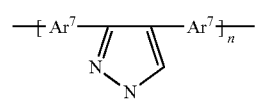 (VII)
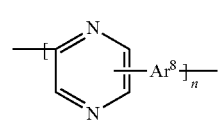 (VIII)
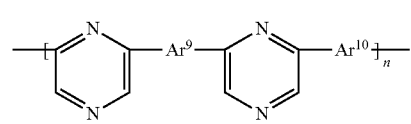 (IX)
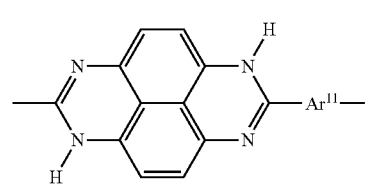 (X)
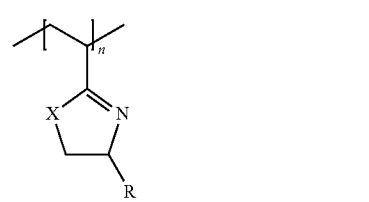 (XI)
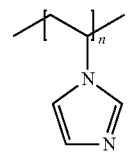 (XII)
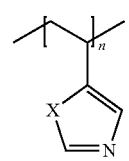 (XIII)
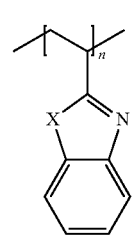 (XIV)
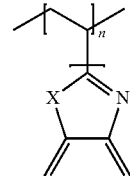 (XV)
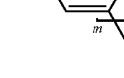 (XVI)
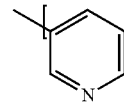 (XVII)
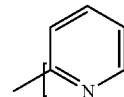 (XVIII)
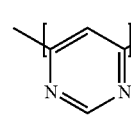 (XIX)
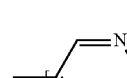 
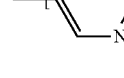 
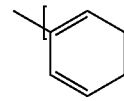 (XX)
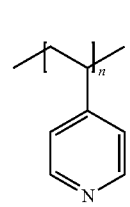 (XXI)

-continued

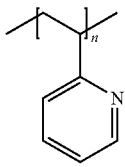
(XXII)

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic,
$Ar^5$ are the same or different and are each a tetravalent aromatic or heteroaromatic group which may be mono- or polycyclic,
$Ar^6$ are the same or different and are each a divalent aromatic or heteroaromatic group which may be mono- or polycyclic,
$Ar^7$ are the same or different and are each a divalent aromatic or heteroaromatic group which may be mono- or polycyclic,
$Ar^8$ are the same or different and are each a trivalent aromatic or heteroaromatic group which may be mono- or polycyclic,
$Ar^9$ are the same or different and are each a di- or tri- or tetravalent aromatic or heteroaromatic group which may be mono- or polycyclic,
$Ar^{10}$ are the same or different and are each a di- or trivalent aromatic or heteroaromatic group which may be mono- or polycyclic,
$Ar^{11}$ are the same or different and are each a divalent aromatic or heteroaromatic group which may be mono- or polycyclic,
X are the same or different and are each oxygen, sulfur or an amino group which bears a hydrogen atom, a group having 1-20 carbon atoms, preferably a branched or unbranched alkyl or alkoxy group, or an aryl group as further radical,
R is the same or different and is hydrogen, an alkyl group or an aromatic group, with the proviso that R in formula (XX) is not hydrogen, and
n, m are each an integer greater than or equal to 10, preferably greater than or equal to 100.

The term "azole" means that the polymer has at least one repeating unit comprising an aromatic ring in which at least one nitrogen heteroatom is present in said aromatic ring. Said at least one nitrogen heteroatom typically is bonded to hydrogen.

Preferred aromatic or heteroaromatic groups are derived from benzene, naphthalene, biphenyl, diphenyl ether, diphenylmethane, diphenyldimethylmethane, bisphenone, diphenylsulphone, chinoline, pyridine, bipyridine, pyridazin, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted. In this case, $Ar^1$, $Ar^4$, $Ar^6$, $Ar^7$, $Ar^8$, $Ar^9$, $Ar^{10}$, $Ar^{11}$ can have any substitution pattern, in the case of phenylene, for example, $Ar^1$, $Ar^4$, $Ar^6$, $Ar^7$, $Ar^9$, $Ar^{10}$, $Ar^{11}$ can be ortho-, meta- and para-phenylene. Particularly preferred groups are derived from benzene and biphenylene, which may also be substituted. Preferred alkyl groups are short-chain alkyl groups having from 1 to 4 carbon atoms, such as, e.g., methyl, ethyl, n-propyl or isopropyl and t-butyl groups. Preferred aromatic groups are phenyl or naphthyl groups. The alkyl groups and the aromatic groups can be substituted.

Preferred substituents are halogen atoms such as, e.g., fluorine, amino groups, hydroxyl groups or short-chain alkyl groups such as, e.g., methyl or ethyl groups. Polyazoles having recurring units of the formula (I) are preferred wherein the radicals X within one recurring unit are identical.

The polyazoles can in principle also have different recurring units wherein their radicals X are different, for example. It is preferable, however, that a recurring unit has only identical radicals X.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer containing recurring azole units is a copolymer as described in U.S. patent application Ser. No. 13/769,413 which entire scope is hereby incorporated by reference.

In a particularly preferred embodiment of the present invention, the polymer containing recurring azole units is a polyazole, which only contains units of the formulae (I) and/or (II).

The number of recurring azole units in the polymer is preferably an integer greater than or equal to 10. Particularly preferred polymers contain at least 100 recurring azole units.

Within the scope of the present invention, polymers containing recurring benzimidazole units are preferred. Some examples of the most appropriate polymers containing recurring benzimidazole units are represented by the following formulae:

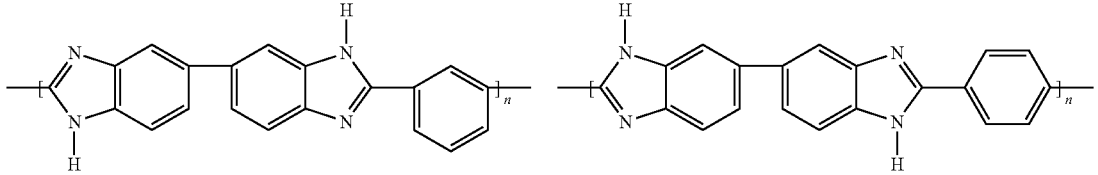

-continued
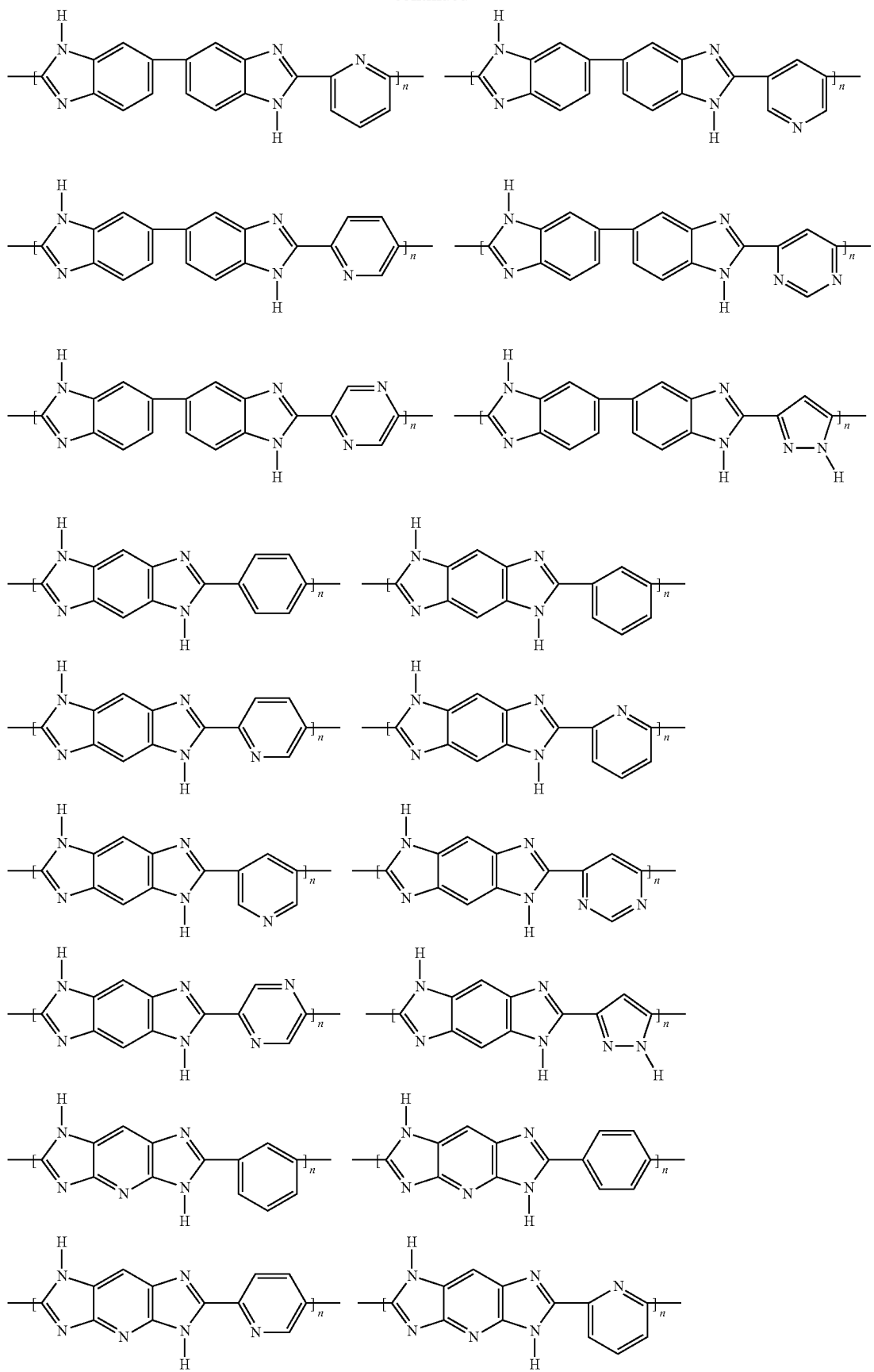

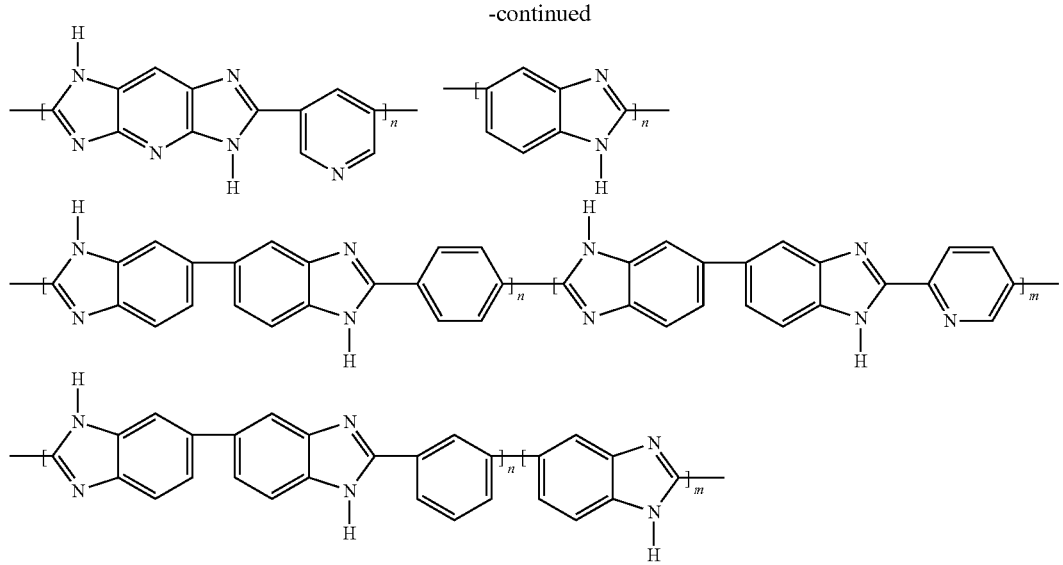

where n and m are each an integer greater than or equal to 10, preferably greater than or equal to 100.

The polyazoles used, in particular, however, the polybenzimidazoles are characterized by a high molecular weight. Measured as the intrinsic viscosity, this is preferably at least 0.2 dl/g, preferably 0.8 to 10 dl/g, in particular 1 to 10 dl/g.

The preparation of such polyazoles is known, wherein one or more aromatic tetraamino compounds are reacted in the melt with one or more aromatic carboxylic acids or the esters thereof, containing at least two acid groups per carboxylic acid monomer, to form a prepolymer. The resulting prepolymer solidifies in the reactor and is then comminuted mechanically. The pulverulent prepolymer is usually endpolymerised in a solid-phase polymerisation at temperatures of up to 400° C.

The preferred aromatic carboxylic acids used according to the invention are, among others, dicarboxylic and tricarboxylic acids and tetracarboxylic acids or their esters or their anhydrides or their acid chlorides. The term aromatic carboxylics acid likewise also comprises heteroaromatic carboxylic acids. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, 2,2-bis-(4-carboxyphenyl)hexafluoropropane, 4,4'-stilbenedicarboxylic acid, 4-carboxycinnamic acid or their C1-C20 alkyl esters or C5-C12 aryl esters or their acid anhydrides or their acid chlorides.

The aromatic tricarboxylic acids, tetracarboxylic acids or their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid; 3,5,4'-biphenyltricarboxylic acid.

The aromatic tetracarboxylic acids or their C1-C20 alkyl esters or C5-C12 aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are heteroaromatic dicarboxylic acids and tricarboxylic acids and tetracarboxylic acids or their esters or their anhydrides. Heteroaromatic carboxylic acids are understood to mean aromatic systems which contain at least one nitrogen, oxygen, sulphur or phosphor atom in the aromatic group. Preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid and their C1-C20 alkyl esters or C5-C12 aryl esters or their acid anhydrides or their acid chlorides are used.

The content of tricarboxylic acids or tetracarboxylic acids (based on dicarboxylic acid used) is between 0 and 30 mol-%, preferably 0.1 and 20 mol-%, in particular 0.5 and 10 mol-%.

The aromatic and heteroaromatic diaminocarboxylic acids used are preferably diaminobenzoic acid and its monohydrochloride and dihydrochloride derivatives. Preferably, mixtures of at least 2 different aromatic carboxylic acids are used. Particularly preferably, mixtures are used which also contain heteroaromatic carboxylic acids additionally to aromatic carboxylic acids. The mixing ratio of aromatic carboxylic acids to heteroaromatic carboxylic acids is from 1:99 to 99:1, preferably 1:50 to 50:1.

These mixtures are in particular mixtures of N-heteroaromatic dicarboxylic acids and aromatic dicarboxylic acids. Non-limiting examples of these are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The preferred aromatic tetraamino compounds include, amongst others, 3,3',4,4'-tetraaminobiphenyl, 2,3,5,6-tetraaminopyridine, 1,2,4,5-tetraaminobenzene, 3,3',4,4'-tetraaminodiphenyl sulphone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane as well as their salts, in particular their monohydrochloride, dihydrochloride, trihydrochloride and tetrahydrochloride derivatives.

Preferred polybenzimidazoles are commercially available.

Preferred polymers include polysulphones, in particular polysulphone having aromatic and/or heteroaromatic groups in the backbone. According to a particular aspect of the present invention, preferred polysulphones and polyethersulphones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133. Here, preference is given to polysulphones with a Vicat softening temperature VST/A/50 of 180° C. to 230° C. In yet another preferred embodiment of the present invention, the number average of the molecular weight of the polysulphones is greater than 30,000 g/mol.

The polymers based on polysulphone include in particular polymers having recurring units with linking sulphone groups according to the general formulae A, B, C, D, E, F and/or G:

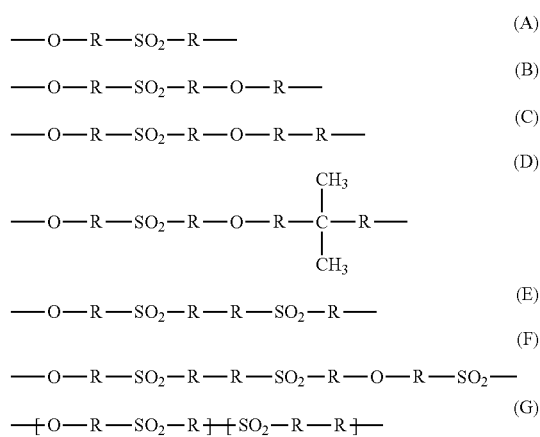

wherein the functional groups R, independently of another, are identical or different and represent aromatic or heteroaromatic groups, these functional groups having been explained in detail above. These include in particular 1,2-phenylene, 1,3-phenylene, 1,4-phenylene, 4,4'-biphenyl, pyridine, quinoline, naphthalene, phenanthrene.

The polysulphones preferred within the scope of the present invention include homopolymers and copolymers, for example random copolymers. Particularly preferred polysulphones comprise recurring units of the formulae H to N:

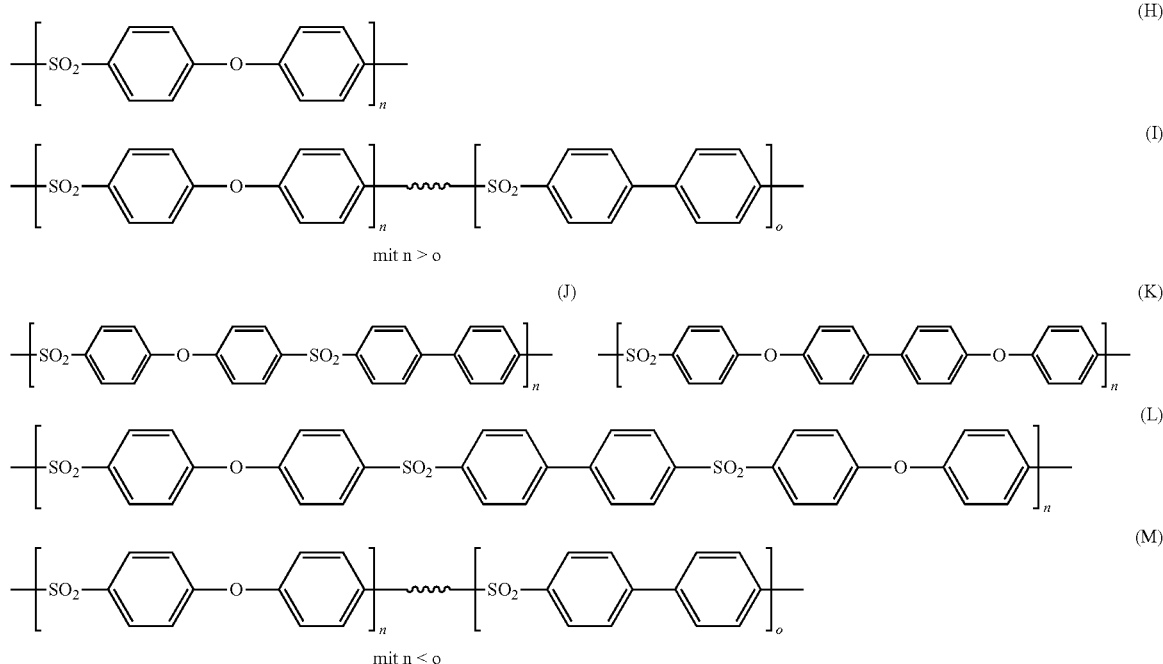

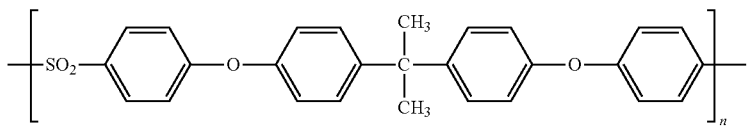

(N)

wherein the radicals R, independently of another, identical or different, represent aromatic or heteroaromatic groups, these radicals having been explained in detail above. These include in particular 1,2-phenylene, 1,3-phenylene, 1,4-phenylene, 4,4'-biphenyl, pyridine, quinoline, naphthalene, phenanthrene.

The polysulphones preferred within the scope of the present invention include homopolymers and copolymers, for example random copolymers. Particularly preferred polysulphones comprise recurring units of the formulae H to N:

The polysulphones or polyphenylsulfonesdescribed above can be obtained commercially under the trade names ®Victrex 200 P,®Victrex 720 P,®Ultrason E,®Ultrason S,®Ultrason P,®Mindel,®Radel A,®Radel R,®Victrex HTA,®Astrel and ®Udel.

Furthermore, polyether ketones, polyether ketone ketones, polyether ether ketones, polyether ether ketone ketones and polyaryl ketones are particularly preferred. These high-performance polymers are known per se and can be obtained commercially under the trade names Victrex® PEEK™,®Hostatec,®Kadel.

To produce polymer films, a polymer, preferably a polyazole can be dissolved in an additional step in polar, aprotic solvents such as dimethylacetamide (DMAc) and a film is produced by means of classical methods.

In order to remove residues of solvents, the film thus obtained can be treated with a washing liquid as is described in European patent application EP-A-1,368,845. Due to the cleaning of the polyazole film to remove residues of solvent described in the German patent application, the mechanical properties of the film are surprisingly improved. These properties include in particular the E-modulus, the tear strength and the break strength of the film.

Additionally, the polymer film can have further modifications, for example by cross-linking, as described in European patent application EP-A-1,373,379 or in WO 00/44816. In a preferred embodiment, the polymer film used consisting of an alkaline polymer and at least one blend component additionally contains a cross-linking agent, as described in European patent application EP-A-1,425,336.

The thickness of the polyazole films can be within wide ranges. Preferably, the thickness of the polyazole film before its doping with an acid is generally in the range of from 5 µm to 2000 µm, and particularly preferably 10 µm to 1000 µm; however, this should not constitute a limitation.

In order to achieve proton conductivity, these films are doped with acids. In this context, acids include all known Lewis- und Bransted acids, preferably inorganic Lewis- und Bransted acids.

Furthermore, the application of polyacids is also possible, in particular isopolyacids and heteropolyacids, as well as mixtures of different acids. Here, heteropolyacids according to the invention define inorganic polyacids with at least two different central atoms formed of weak, polyalkaline oxygen acid of a metal (preferably Cr, MO, V, W) and a non-metal (preferably As, I, P, Se, Si, Te) as partial mixed anhydrides. Amongst others, to this group belong the 12-phosphomolybdatic acid and the 12-phosphotungstic acid.

The degree of doping can influence the conductivity of the polyazole film. The conductivity increases with rising concentration of the doping substance until a maximum value is reached. According to the invention, the degree of doping is given as mole of acid per mole of repeating unit of the polymer. Within the scope of the present invention, a degree of doping between 3 and 50, particularly between 5 and 40 is preferred.

Particularly preferred doping substances are phosphoric and sulphuric acids, or compounds releasing these acids for example during hydrolysis, respectively. A very particularly preferred doping substance is phosphoric acid ($H_3PO_4$). Here, highly concentrated acids are generally used. According to a particular aspect of the present invention, the concentration of the phosphoric acid can preferably be at least 50% by weight, particularly at least 20% by weight, based on the weight of the doping substance.

Furthermore, proton conductive membranes can be obtained by a method comprising the steps:
I) Dissolving the polymers, particularly polyazoles in phosphoric acid
II) heating the mixture obtainable in accordance with step i) under inert gas to temperatures of up to 400° C.,
III) forming a membrane using the solution of the polyazole polymer in accordance with step II) on a support and
IV) treatment of the membrane formed in step III) until it is self-supporting.

Furthermore, doped polyazole films can be obtained by a method comprising the steps:
A) mixing one or more aromatic tetraamino compounds with one or more aromatic carboxylic acids or their esters, which contain at least two acid groups per carboxylic acid monomer, or mixing one or more aromatic and/or heteroaromatic diaminocarboxylic acids, in polyphosphoric acid with formation of a solution and/or dispersion,
B) applying a layer using the mixture in accordance with step A) to a support or to an electrode,
C) heating the flat structure/layer obtainable in accordance with step B) under inert gas to temperatures of up to 350° C., preferably up to 280° C., with formation of the polyazole polymer,
D) treatment of the membrane formed in step C) (until it is self-supporting).

The aromatic or heteroaromatic carboxylic acids and tetraamino compounds to be employed in step A) have been described above.

The polyphosphoric acid used in step 1) and step A) is a customary polyphosphoric acid as is available, for example, from Riedel-de Haen. The polyphosphoric acids $H_{n+2}P_nO_{3n+1}$ (n>1) usually have a concentration of at least 83%, calculated as $P_2O_5$ (by acidimetry). Instead of a solution of the monomers, it is also possible to produce a dispersion/suspension.

The mixture produced in step A) has a weight ratio of polyphosphoric acid to the sum of all monomers of from 1:10,000 to 10,000:1, preferably 1:1,000 to 1,000:1, in particular 1:100 to 100:1.

The layer formation in accordance with step B) is performed by means of measures known per se (pouring, spraying, application with a doctor blade) which are known from the prior art of polymer film production. Every support that is considered as inert under the conditions is suitable as a support. To adjust the viscosity, phosphoric acid (conc. phosphoric acid, 85%) can be added to the solution, where required. Thus, the viscosity can be adjusted to the desired value and the formation of the membrane be facilitated.

The layer produced in accordance with step B) has a thickness of 20 to 4000 µm, preferably of 30 to 3500 µm, in particular of 50 to 3000 µm.

If the mixture in accordance with step A) also contains tricarboxylic acids or tetracarboxylic acid, branching/cross-linking of the formed polymer is achieved therewith. This contributes to an improvement in the mechanical property.

The treatment of the polymer layer produced in accordance with step C) in the presence of moisture at temperatures and for a period of time until the layer exhibits a sufficient strength for use in fuel cells. The treatment can be effected to the extent that the membrane is self-supporting so that it can be detached from the support without any damage.

The flat structure obtained in step B) is, in accordance with step C), heated to a temperature of up to 350° C., preferably up to 280° C. and particularly preferably in the range of 200° C. to 250° C. The inert gases to be employed in step C) are known to those in the field. Particularly nitrogen, as well as noble gases, such as neon, argon and helium belong to this group.

In a variant of the method, the formation of oligomers and polymers can already be brought about by heating the mixture resulting from step A) to a temperature of up to 350° C., preferably up to 280° C. Depending on the selected temperature and duration, it is than possible to dispense partly or fully with the heating in step C). This variant also subject of the present invention.

The treatment of the membrane in step D) is performed at temperatures in the range of 0° C. to 150° C., preferably at temperatures between 10° C. and 120° C., in particular between room temperature (20° C.) and 90° C., in the presence of moisture or water and/or steam and/or water-containing phosphoric acid of up to 85%.

The treatment is preferably performed at normal pressure, but can also be carried out with action of pressure. It is essential that the treatment takes place in the presence of sufficient moisture whereby the polyphosphoric acid present contributes to the solidification of the membrane by means of partial hydrolysis with formation of low molecular weight polyphosphoric acid and/or phosphoric acid.

The partial hydrolysis of the organic phosphoric acid in step D) leads to a solidification of the membrane and a reduction in the layer thickness and the formation of a membrane having a thickness between 15 and 3000 µm, preferably between 20 and 2000 µm, in particular between 20 and 1500 µm, which is self-supporting. The intramolecular and intermolecular structures (interpenetrating networks IPN) that, in accordance with step B), are present in the polyphosphoric acid layer lead to an ordered membrane formation in step C), which is responsible for the special properties of the membrane formed.

The upper temperature limit for the treatment in accordance with step D) is typically 150° C. With extremely short action of moisture, for example from overheated steam, this steam can also be hotter than 150° C. The duration of the treatment is substantial for the upper limit of the temperature.

The partial hydrolysis (step D) can also take place in climatic chambers where the hydrolysis can be specifically controlled with defined moisture action. In this connection, the moisture can be specifically set via the temperature or saturation of the surrounding area in contact with it, for example gases such as air, nitrogen, carbon dioxide or other suitable gases, or steam. The duration of the treatment depends on the parameters chosen as aforesaid.

Furthermore, the duration of the treatment depends on the thickness of the membrane. Typically, the duration of the treatment amounts to between a few seconds to minutes, for example with the action of overheated steam, or up to whole days, for example in the open air at room temperature and lower relative humidity.

Preferably, the duration of the treatment is 10 seconds to 300 hours, in particular 1 minute to 200 hours.

If the partial hydrolysis is performed at room temperature (20° C.) with ambient air having a relative humidity of 40-80%, the duration of the treatment is 1 to 200 hours.

The membrane obtained in accordance with step D) can be formed in such a way that it is self-supporting, i.e. it can be detached from the support without any damage and then directly processed further, if applicable.

The concentration of phosphoric acid and therefore the conductivity of the polymer membrane according to the invention can be set via the degree of hydrolysis, i.e. the duration, temperature and ambient humidity. The concentration of the phosphoric acid is given as mole of acid per mole of repeating unit of the polymer. Membranes with a particularly high concentration of phosphoric acid can be obtained by the method comprising the steps A) to D). A concentration of 10 to 50 (mol of phosphoric acid related to a repeating unit of formula (I) for example polybenzimidazole), particularly between 12 and 40 is preferred. Only with very much difficulty or not at all is it possible to obtain such high degrees of doping (concentrations) by doping polyazoles with commercially available orthophosphoric acid.

According to a modification of the method described, wherein doped polyazole films are produced by using phosphoric acid, the production of these films can be carried out by a method comprising the following steps:

1) reacting one or more aromatic tetraamino compounds with one or more aromatic carboxylic acids or their esters which contain at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained in accordance with step 1) in phosphoric acid
3) heating the solution obtainable in accordance with step 2) under inert gas to temperatures of up to 300° C., preferably up to 280° C., with formation of the dissolved polyazole polymer,
4) forming a membrane using the solution of the polyazole polymer in accordance with step 3) on a support and
5) treatment of the membrane formed in step 4) until it is self-supporting.

The steps of the method described under 1) to 5) have been explained in detail for the steps A) to D), where reference is made thereto, particularly with regard to the preferred embodiments.

A membrane, particularly a membrane based on polyazoles, can further be cross-linked at the surface by action of heat in the presence of atmospheric oxygen. This hardening of the membrane surface further improves the properties of the membrane. To this end, the membrane can be heated to a temperature of at least 150° C., preferably at least 200° C.

and particularly preferably at least 250° C. In this step of the method, the oxygen concentration usually is in the range of 5 to 50% by volume, preferably 10 to 40% by volume; however, this should not constitute a limitation.

The cross-linking can also take place by action of IR or NIR (IR=infrared, i.e. light having a wavelength of more than 700 nm; NIR=near-IR, i.e. light having a wavelength in the range of about 700 to 2000 nm and an energy in the range of about 0.6 to 1.75 eV), respectively. Another method is β-ray irradiation. In this connection, the irradiation dose is from 5 and 200 kGy.

Depending on the degree of cross-linking desired, the duration of the cross-linking reaction can be within a wide range. In general, this reaction time lies in the range from 1 second to 10 hours, preferably 1 minute to 1 hour, without this being intended to represent any limitation.

The thickness of the polymer electrolyte membrane used in the present process and placed in step i), is from 50 to 1,000 μm, preferably from 100 to 500 μm. (all number prior to any compression)

Particularly preferred polymer membranes show a high performance. The reason for this is in particular improved proton conductivity. This is at least 100 mS/cm, preferably at least 110 mS/cm, in particular at least 120 mS/cm at temperatures of 120° C., preferably of 160° C. These values are achieved without moistening here.

Gas Diffusion Layer

The membrane electrode unit according to the invention has two gas diffusion layers which are separated by the polymer electrolyte membrane. Flat, electrically conductive and acid-resistant structures are commonly used for this. These include, for example, woven or non-woven textile surfaces comprising graphite and/or carbon fibers. Preferred are graphite-fibre paper, carbon-fibre paper, graphite fabric and/or paper which was rendered conductive by addition of carbon black. Most preferred are non-woven, in particular papers. Through these layers, a fine distribution of the flows of gas and/or liquid is achieved.

Generally, this layer, prior to any compression, has a thickness in the range of from 80 μm to 2000 μm, in particular 100 μm to 1000 μm and particularly preferably 150 μm to 500 μm.

According to a particular embodiment, at least one of the gas diffusion layers can be comprised of a compressible material. Within the scope of the present invention, a compressible material is characterized by the property that the gas diffusion layer can be compressed by pressure by at least 2% it's thickness, and in particular 5%-30% of its original thickness without losing its integrity.

This property is generally exhibited by a gas diffusion layer made of graphite fabric and/or paper which was rendered conductive by addition of carbon black.

Catalyst Layer

The catalyst layer(s) contain(s) catalytically active substances. These include, amongst others, precious metals of the platinum group, i.e. Pt, Pd, Ir, Rh, Os, Ru, or also the precious metals Au and Ag. Furthermore, alloys of the above-mentioned metals may also be used. Additionally, at least one catalyst layer can contain alloys of the elements of the platinum group with non-precious metals, such as for example Fe, Co, Ni, Cr, Mn, Zr, Ti, Ga, V, etc. Furthermore, the oxides of the above-mentioned precious metals and/or non-precious metals can also be employed.

The catalytically active particles comprising the above-mentioned substances may be employed as metal powder, so-called black precious metal, in particular platinum and/or platinum alloys. Such particles generally have a size in the range from 5 nm to 200 nm, preferably in the range from 7 nm to 100 nm.

Furthermore, the metals can also be employed on a support material. Preferably, this support comprises carbon which particularly may be used in the form of carbon black, graphite or graphitised carbon black. Furthermore, electrically conductive metal oxides, such as for example, $SnO_x$, $TiO_x$, or phosphates, such as e.g. $FePO_x$, $NbPO_x$, $Zr_y(PO_x)_z$, can be used as support material. In this connection, the indices x, y and z designate the oxygen or metal content of the individual compounds which can lie within a known range as the transition metals can be in different oxidation stages.

The content of these metal particles on a support, based on the total weight of the bond of metal and support, is generally in the range of 1 to 80% by weight, preferably 5 to 60% by weight and particularly preferably 10 to 50% by weight; however, this should not constitute a limitation. The particle size of the support, in particular the size of the carbon particles, is preferably in the range of 20 to 1000 nm, in particular 30 to 100 nm. The size of the metal particles present thereon is preferably in the range of 1 to 20 nm, in particular 1 to 10 nm and particularly preferably 2 to 6 nm.

The sizes of the different particles represent mean values and can be determined via transmission electron microscopy or X-ray powder diffractometry.

The catalytically active particles set forth above can generally be obtained commercially.

Furthermore, the catalytically active layer may contain customary additives. These include, amongst others, fluoropolymers, such as e.g. polytetrafluoroethylene (PTFE) and fluorinated ethylene polypropylene (FEP) proton-conducting ionomers and surface-active substances.

According to a particular embodiment of the present invention, the weight ratio of fluoropolymer to catalyst material comprising at least one precious metal and optionally one or more support materials is greater than 0.1, this ratio preferably lying within the range of 0.2 to 0.6.

According to a particular embodiment of the present invention, the catalyst layer (prior to any compression) has a thickness in the range of 1 to 1000 μm, in particular from 5 to 500, preferably from 10 to 300 μm. This value represents a mean value, which can be determined by averaging the measurements of the layer thickness from photographs that can be obtained with a scanning electron microscope (SEM).

The catalyst layer is in general not self-supporting but is usually applied to the gas diffusion layer and/or the membrane, preferably the catalyst layer is on the gas diffusion layer, thus forming the gas diffusion electrode.

According to a particular embodiment of the present invention, the content of precious metals of the catalyst layer is 0.1 to 10.0 mg/cm$^2$, preferably 0.3 to 6.0 mg/cm$^2$ and particularly preferably 0.3 to 3.0 mg/cm$^2$. These values can be determined by elemental analysis of a flat sample.

For further information on membrane electrode units, reference is made to the technical literature, in particular the patent applications WO 01/18894 A2, DE 195 09 748, DE 195 09 749, WO 00/26982, WO 92/15121 and DE 197 57 492. The disclosure contained in the above-mentioned citations with respect to the structure and production of membrane electrode units as well as the electrodes, gas diffusion layers and catalysts to be chosen is also part of the description.

The electrochemically active surface of the catalyst layer defines the surface which is in contact with the polymer electrolyte membrane and at which the redox reactions set forth above can take place. The present invention allows for the formation of particularly large electrochemically active surfaces. According to a particular aspect of the present invention, the size of this electrochemically active surface is at least 2 cm$^2$, in particular at least 5 cm$^2$ and preferably at least 10 cm$^2$; however, this should not constitute a limitation. The instant method is particular suitable for larger electrochemically active surfaces which are at least 100 cm$^2$, preferably at least 200 cm$^2$.

The thickness of the gas diffusion layer having a catalyst layer coating (=gas diffusion electrode), which is the total of the thickness of the gas diffusion layer and the catalyst layer, placed in step f) and o) is from 100 to 700 µm, preferably from 200 to 500 µm. (all number prior to any compression)

Polymer Frame Subgasket

A membrane electrode unit according to the invention has on at least one of the two surfaces of the polymer electrolyte membrane, that are in contact with a catalyst layer, a polymer frame subgasket, the inner area of which is provided on at least one of the surfaces of the polymer electrolyte membrane, and an outer area which is not provided on the surface of a gas diffusion layer. In this connection, provided means that the inner area has an area overlapping with a polymer electrolyte membrane if an inspection perpendicular to the surface of polymer electrolyte membrane or of the inner area of the frame is carried out. On the contrary, the outer area has no area overlapping with a gas diffusion layer if an inspection perpendicular to the surface of a gas diffusion layer or of the outer area of the frame is carried out. In this context, the notions of "inner" and "outer" area relate to the same surface or the same side of the frame, so that an allocation can only be made after the frame has contacted the membrane or the gas diffusion layer.

The thickness of the polymer frame subgasket used in the present process and placed in step g) and m) is from 20 to 300 µm, preferably from 30 to 100 µm (all number prior to any compression).

Generally, the polymer frame subgasket overlaps with the peripheral area of the gas diffusion layer/catalyst layer, said overlap being preferably at least 1 mm, preferably at least 1.5 mm, most preferred at least 2 mm. Since the overlap reduces the electrochemical active area of the MEU, the upper limit is merely depending on the economics. The skilled worker will select such upper limit on the particular field in which the MEU are used. The range of appropriate overlap between GDE and subgasket can range between 1.5 mm to 15 mm, and preferably from 2.5 to 5 mm. The particular overlap selected is dependent on the overall length and width of the MEU and final application.

The polymer frame subgasket can be made from various polymer materials which exhibit a long-term service temperature of at least 160° C., preferable 180° C., more preferred at least 190° C., more preferably at least 220° C. and most preferably at least 250° C., measured in accordance with MIL-P-46112B, paragraph 4.4.5. Examples for suitable polymer materials are, amongst others, polyphenylenes, phenol resins, phenoxy resins, polysulphide ether, polyphenylenesulphide, polyethersulphones, polyimines, polyetherimines, polyazoles, polybenzimidazoles, polybenzoxazoles, polybenzothiazoles, polybenzoxadiazoles, polybenzotriazoles, polyphosphazenes, polyether ketones, polyketones, polyether ether ketones, polyether ketone ketones, polyphenylene amides, polyphenylene oxides, polyimides and mixtures of two or more of these polymers.

According to a preferred aspect of the present invention, the polymer frame subgasket is a film having a tensile strength of at least 6 N/mm$^2$, preferably at least 7 N/mm$^2$, measured at 80° C., preferably 160° C., and an elongation of 100%. Measurement of these values is carried out in accordance with DIN EN ISO 527-1

According to a preferred aspect of the present invention, the polymer frame subgasket is a film being coated with a meltable polymer, preferably fluoropolymer, such as for example poly(tetrafluoroethylen-co-hexafluoropropylene) FEP, polyvinylidenefluoride PVDF, perfluoroalkoxy polymer PFA, poly(tetrafluoroethylen-co-perfluoro(methylvinylether)) MFA. These polymers are in many cases commercially available, for example under the trade names Hostafon®, Hyflon®, Teflon®, Dyneon® and Nowoflon®. The thickness of such coating is most typically at least 0.5 µm, in particular at least 2.5 µm.

At least one polymer frame subgasket, preferably both, is (are) usually in contact with electrically conductive separator plates which are typically provided with flow field channels on the sides facing the gas diffusion layers to allow for the distribution of reactant fluids. The separator plates are usually manufactured of graphite or conductive, thermally stable plastic.

Generally, interacting with the separator plates, the polymer frame seals the gas spaces against the outside. Furthermore, the polymer frame generally also seals the gas spaces between anode and cathode.

The polymer frame subgasket contacts and overlaps the catalyst layer and/or the gas diffusion layer via the edge surfaces. The edge surfaces are those surfaces that are formed of the thickness of the electrode or the frame and the corresponding length or width of these layers.

Preferably, the polymer frame subgasket contacts and overlaps the catalyst layer and/or the gas diffusion layer via the surface that is defined by the length and the width of the frame or the electrode, respectively.

The Base

The base used in the present invention can be made of polymer material or metals, but is not limited to those materials. The base has to be stable enough for handling in the present process and must be planar. The material for the base should be a non-sticking material so that the tray can be easily removed from the base. Suitable materials are inter alia Acrylics, Polycarbonate, PLA, PVC, ABS, Polystyrene, HDPE, Polypropylene, UHMW, Delrin Acetal Resin, Nylon, CPVC, Noryl PPO, Polyester, PVDF, Polysulfone,®Radel PPSU, PPS, PTFE, Torlon PAI, Most typically the base has a thickness of 10 to 13 mm.

The base used in the present invention has holes for placing an alignment tooling in said holes. Instead of holes deepening's can be used within the spirit of the instant invention. Said alignment toolings are most typically pins or poles which can be plugged or screwed into the holes/deepening's so that they can be removed reversibly later on in the process. The holes for the alignment tooling being arranged at least at the peripheral edges of the MEU being manufactured. Thus, for a quadrangular MEU at least 4 alignment tooling and 4 holes for placing the alignment tooling are required. For larger MEU is can be beneficial to have additional holes and alignment toolings at each side of the MEU to be manufactured. Such additional alignment tooling holes are each centred at such sides.

Similarly, a pin table can be constructed whereby said pins can be moved up for use and down and away for pressing the assembly via electromechanical systems and a suitable switch. In this alternative the pin table replaces the base in step a), the placing of the pins in step c) becomes obsolete and the tray in step b) is placed on the pin table directly. The subsequent steps d) to p) remain as is and in step q) the pins are moved down and away for pressing in step r).

The holes/deepening's and the alignment tooling being placed in said holes/deepening's typically are of round shape and have no sharp edges. The spherical diameter of the holes and the alignment tooling being placed in said holes is most typically from about 3 mm to about 5 mm.

The alignment tooling can be made of polymer material or metals, but is not limited to those materials. The alignment tooling has to be stable enough for handling in the present process and must be resistant against the acids being present in the polymer electrolyte membrane. The material for the alignment tooling should be a non-sticking material so that the pins or poles can be easily removed prior to pressing. Suitable materials for the alignment tooling are inter alia stainless steel (Corrosion resistant grade in particular, typically SS316, A286, 321, 2205 or type 17-4 PH), PFA, Kapton, Cast Nylon, CPVC, Rexolite Polystyrene, Noryl PPO, Polyester, PVDF, Polysulfone,®Radel PPSU, FEP, PPS, PEEK, Torlon PAI, PTFE, Aluminum (Corrosion resistant grade Alloy 6061, 6013, 6063, 7075, 7050, 5086, 5052, 5083, 1100, 5005/5205 or 3003) or other metal.

Most typically for practical reasons, the alignment tooling protrude about 25 mm to about 50 mm above the surface of the base on which the items are placed. The aforementioned sizes can be adapted to the needs which are established by the thickness of the individual layers and spaces available in the tooling, e.g. press.

The Tray

The tray used in the present invention can be made of polymer material or metals, but is not limited to those materials. The tray has to be stable enough for handling in the present process and must be planar. The tray can be flexible. The material for the tray should be a non-sticking material so that the tray can be easily removed from the base. Suitable materials are inter alia Titanium, Aluminum (Corrosion resistant grade Alloy 6061, 6013, 6063, 7075, 7050, 5086, 5052, 5083, 1100, 5005/5205 or 3003 or better), stainless steel (Corrosion resistant grade in particular, typically SS316, A286, 321, 2205 or type 17-4 PH or better)

Most typically the tray has a thickness of about 1 mm to 1.5 mm.

The tray used in the present invention has holes matching with pins or poles being placed in the alignment tooling holes of the base.

The Polymer Sheet

The polymer sheet used in the present invention can be made of any polymer material which is stable enough for handling in the present process. The polymer sheet should be a non-sticking material so that the polymer sheet can be easily removed after the pressing. Suitable materials are those described in connection with the abovementioned polymer frame subgaskets. Thus, examples for suitable polymer materials are, amongst others, polyphenylenes, phenol resins, phenoxy resins, polysulphide ether, polyphenylenesulphide, polyethersulphones, polyimines, polyetherimines, polyazoles, polybenzimidazoles, polybenzoxazoles, polybenzothiazoles, polybenzoxadiazoles, polybenzotriazoles, polyphosphazenes, polyether ketones, polyketones, polyether ether ketones, polyether ketone ketones, polyphenylene amides, polyphenylene oxides, polyimides and mixtures of two or more of these polymers.

According to a preferred aspect of the present invention, the polymer sheet is a film having a tensile strength of at least 6 N/mm², preferably at least 7 N/mm², measured at 80° C., preferably 160° C., and an elongation of 100%. Measurement of these values is carried out in accordance with DIN EN ISO 527-1.

The polymer sheet material should be made from non-sticking material so that the polymer sheet can be easily removed after the pressing, which means that no sticking or irreversible bonding of the polymer sheet material is observed during the pressing in step r) which may harm the MEU surfaces when removing the polymer sheet material. In addition, the polymer sheet material should also not penetrate the porous gas diffusion layer backsides so that the porosity is not adversely impacted, e.g. by filling the pores.

Most typically the polymer sheet used in the process and placed in step d) and p) has a thickness of 25 to 75 µm (all number prior to any compression).

The polymer sheet used in the present invention has holes matching with pins or poles being placed in the alignment tooling holes of the base.

The polymer sheet used in the present invention can also be located at the tray either as covering layer or as coating.

The Shim Frame

The shim frame used in the present invention can be made of any polymer material which is stable enough for handling in the present process.

Most typically the shim frame used and placed in step e) and n) has a thickness of 150 µm to 350 µm. To allow for a minimum controlled compression of the polymer electrolyte membrane, the material of the shim frame is a materials which decreases in its thickness over a period of 5 hours, particularly preferably 10 hours, by not more than 5%, in particular not more than 2%, preferably not more than 1%, at a temperature of 120° C., particularly preferably 160° C., and a pressure of 10 N/mm², in particular 15 N/mm² and particularly preferably 20 N/mm². In case the minimum compression is set higher or the shim frame materials has no decrease, the total thickness of the shim frames is less than the thickness of the polymer electrolyte membrane, preferably by at least 5%, more preferred by at least 10%, most preferred by at least 20%. In other words, the total thickness of both, the shim frames and the subgaskets amounts to 80% of the total MEA thickness which is the total thickness of the gas diffusion electrodes and the polymer electrolyte membrane.

The aforementioned compression determined in accordance with the method disclosed in WO 2006/008158.

Thus, examples for suitable polymer materials are, amongst others, polyphenylenes, phenol resins, phenoxy resins, polysulphide ether, polyphenylenesulphide, polyethersulphones, polyimines, polyetherimines, polyazoles, polybenzimidazoles, polybenzoxazoles, polybenzothiazoles, polybenzoxadiazoles, polybenzotriazoles, polyphosphazenes, polyether ketones, polyketones, polyether ether ketones, polyether ketone ketones, polyphenylene amides, polyphenylene oxides, polyimides and mixtures of two or more of these polymers.

According to a preferred aspect of the present invention, the shim frame material having a tensile strength of at least 6 N/mm², preferably at least 7 N/mm², measured at 80° C., preferably 160° C., and an elongation of 100%. Measurement of these values is carried out in accordance with DIN EN ISO 527-1.

The shim frame used in the present invention has holes matching with pins or poles being placed in the alignment tooling holes of the base.

Typically, the shim frame is made from the same material as the alignment tooling. Suitable materials are inter alia stainless steel (Corrosion resistant grade in particular, typically SS316, A286, 321, 2205 or type 17-4 PH), PFA, Kapton, Cast Nylon, CPVC, Rexolite Polystyrene, Noryl PPO, Polyester, PVDF, Polysulfone,®Radel PPSU, FEP, PPS, PEEK, Torlon PAI, PTFE, Aluminum (Corrosion resistant grade Alloy 6061, 6013, 6063, 7075, 7050, 5086, 5052, 5083, 1100, 5005/5205 or 3003) or other metal.

The Cutting Plate Frame

The cutting plate frame used in the present invention can be made of polymer material or metals, but is not limited to those materials. The cutting plate frame has to be stable enough for handling in the present process and must be planar. The cutting plate frame has to withstand the cutting edge of the alignment cutting die. For a disposable type cutting plate, a low cost plastic designed for one time to be as thin as possible without the alignment cutting die from cutting through. For a reusable type cutting plate, a more elaborate setup can be made with built in hardstops for the cutting die to prevent cutting through the cutting plate and damaging the MEU.

The cutting plate frame used in the present invention has holes matching with pins or poles being placed in the alignment tooling holes of the base.

The material for the cutting plate frame should be a non-sticking material so that the polymer electrolyte membrane can be easily removed when cutted. Suitable polymer materials can contain filler particles increasing the resistance against scratches, for example corundum or other fillers with a Mohs scale of mineral hardness of at least 5, preferably at least 7, or surface coatings comprising such particles.

Most typically the cutting plate frame has a thickness of 0.25 mm to 5 mm.

The cutting plate frame used in the present invention has holes matching with pins or poles being placed in the alignment tooling holes of the base.

Preferably, the cutting plate frame used in the present invention has to be stable against the acids being present in the polymer electrolyte membrane because otherwise the corrosion caused by the aforementioned acids would harm the material and reduce the number of cutting cycles for which the cutting plate frame can be used.

The Alignment Cutting Die

The alignment cutting die used in the present invention can be made of polymer material, metals or ceramics, but is not limited to those materials. The alignment cutting die material has to be stable enough for cutting the polymer electrolyte membrane in the present process and the cutting edges of the alignment cutting die should be planar. The alignment cutting die can potentially employ any of the following designs: Standard blade cutting die with preferably a flush bevel cutting edge, but any type of bevel can be used. A Serrated cutting edge can be used to decrease the amount of force necessary to cut the membrane. An angled cutting edge with a recessed channel in the cutting plate can also be used to decrease the amount of force necessary to cut the membrane. An alignment cutting die is not always needed to cut the membrane. Using a slotted cutting plate and a precision cutting knife, the membrane can be cut by hand by sliding the knife along the slot in the cutting plate.

The alignment cutting die used in the present invention has holes matching with pins or poles being placed in the alignment tooling holes of the base.

The material for the alignment cutting die should be a non-sticking material so that the polymer electrolyte membrane can be easily removed when cutted. Suitable materials are inter alia stainless steel, typically SS316, or backer material which is usually lexan or similar type plastic, or ceramics, most typically having a Mohs scale of mineral hardness of at least 5, preferably at least 7.

Preferably, the alignment cutting die used in the present invention has to be stable against the acids being present in the polymer electrolyte membrane because otherwise the corrosion caused by the aforementioned acids would harm the material and reduce the number of cutting cycles for which the alignment cutting die can be used.

The Process Conditions

Step a)

In step a) of the instant invention, a base is placed on which the manufacturing process is performed. The base has holes/deepening's for placing individual alignment tooling in each hole or deepening. The holes are arranged at least at the peripheral edges of the MEU being manufactured. FIG. 1 illustrates such placing of the base.

Thus, for a quadrangular MEU at least 4 alignment tooling and 4 holes for placing the alignment tooling are required. For larger MEU is can be beneficial to have additional holes and alignment toolings at each side of the MEU to be manufactured. Such additional alignment tooling holes are each centred at such sides thus increasing the number of holes/deepening's for placing individual alignment tooling to a total of eight for larger quadrangular MEU. The alignment tooling's can also be placed in step a) instead of in step c)

Step b)

Figure 2:
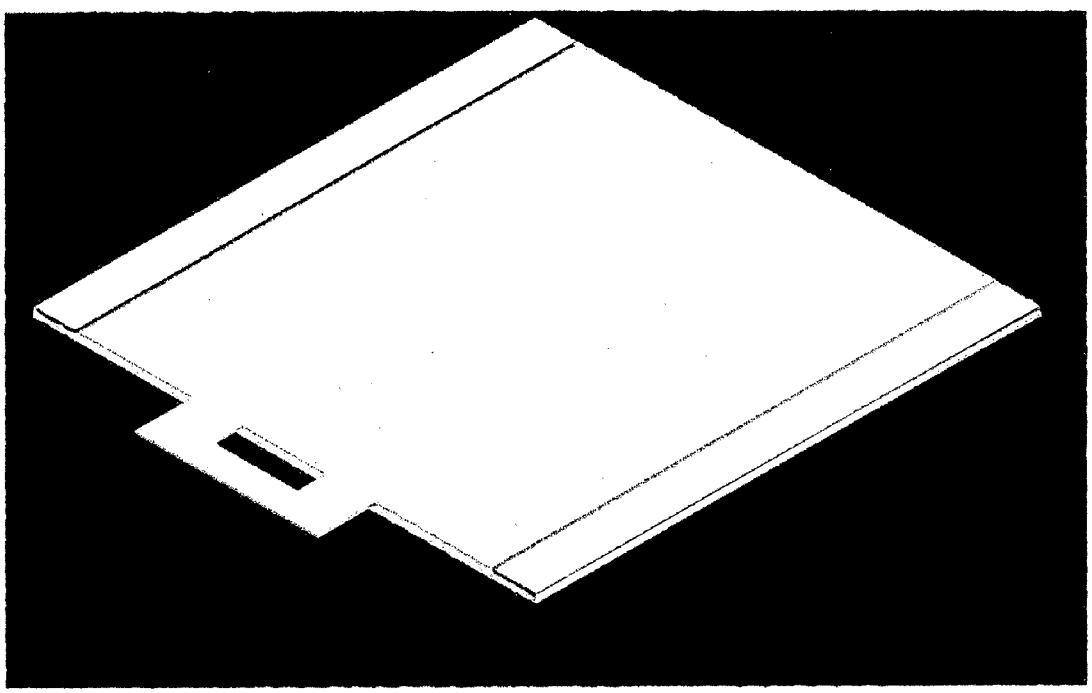
FIG. 2 is an illustration of placing the tray.

In step b) of the instant invention, a tray is placed on top of the base provided in step a). The tray has holes matching with the alignment tooling holes of the base provided in step a). FIG. 2 illustrates such placing of the tray.

Step c)

Figure 3:
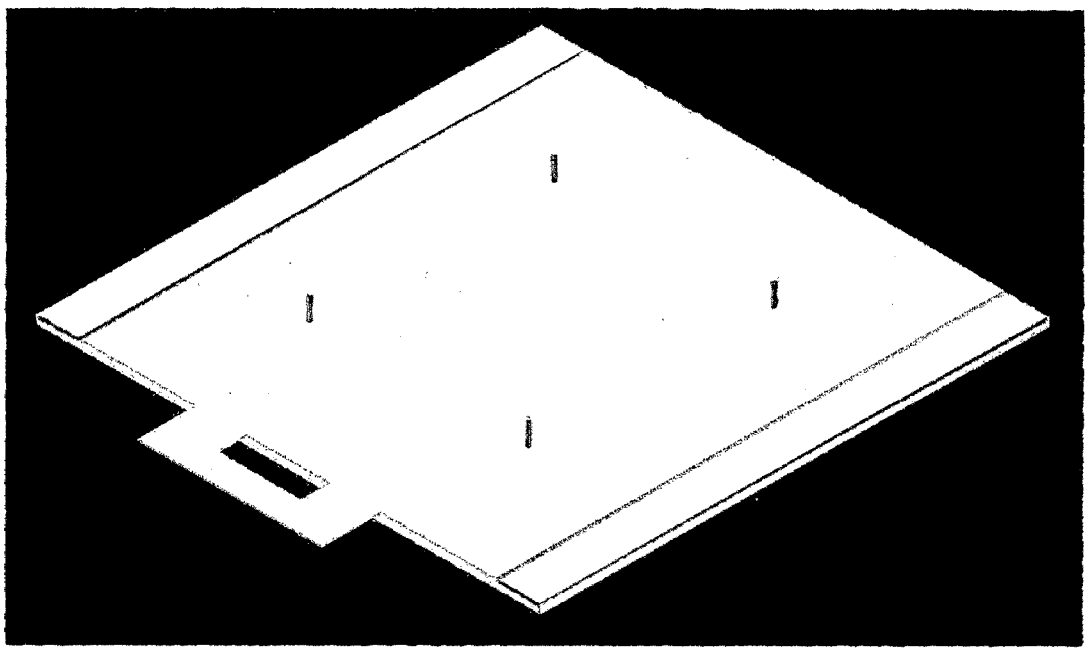
FIG. 3 is an illustration of placing the alignment tooling pins.

In step c) of the instant invention, the alignment tooling pins are placed in the holes of the base through the holes of the tray matching with the alignment tooling holes of the base. FIG. 3 illustrates such placing of the alignment tooling pins.

Step d)

Figure 4:
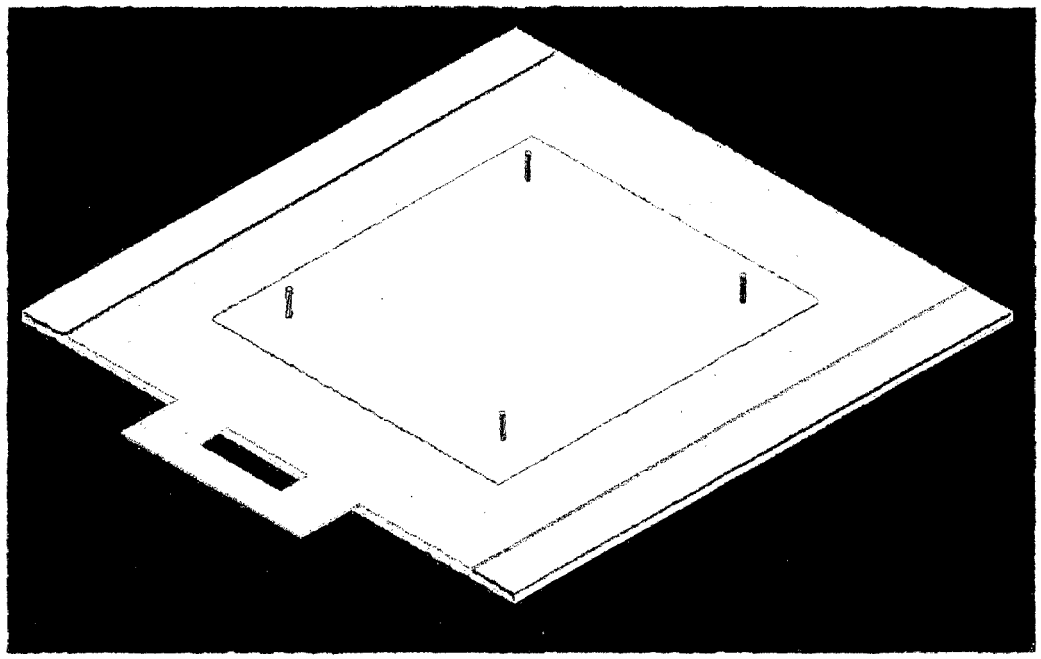
FIG. 4 is an illustration of placing the first polymer sheet.

In step d) of the instant invention, a first polymer sheet with matching alignment tooling holes is placed on top of the tray. The polymer sheet covers at least the entire area of the tray otherwise coming into contact with the two gas diffusion layer furnished later. For simplification the first polymer sheet can cover the entire tray, except for the areas of the alignment tooling holes. As mentioned, the first polymer sheet can also be a part of the tray's surface coming into contact with the gas diffusion layer furnished later, in this alternative the first polymer sheet is laminated onto the tray surface or being present on said surface as surface coating. The first polymer sheet should be placed in such a manner that no wrinkles occur. FIG. 4 illustrates such placing of the first polymer sheet.

Step e)

Figure 5:
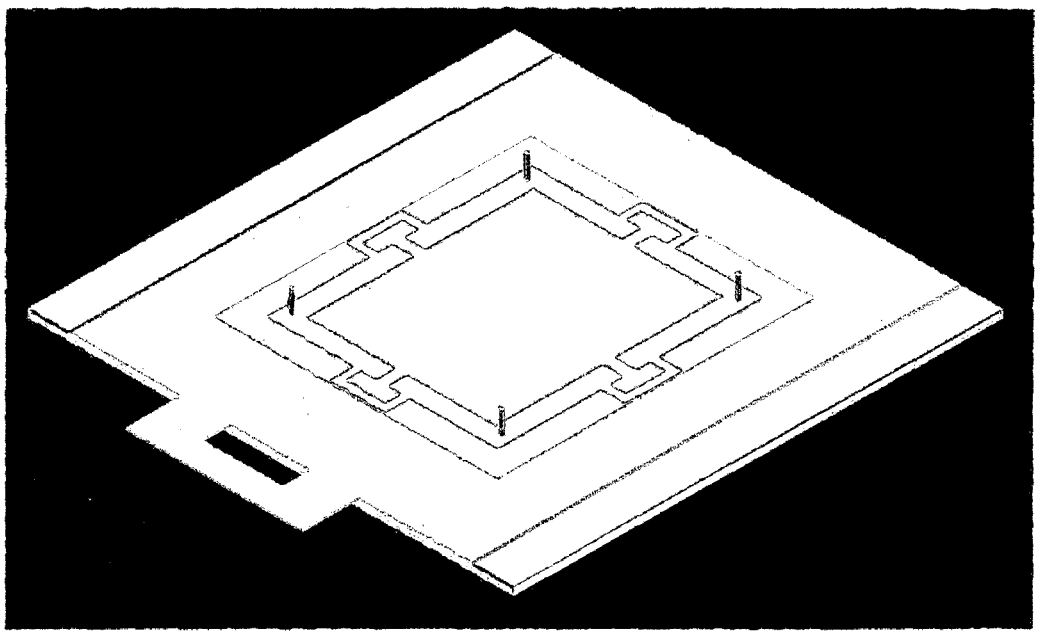
FIG. 5 is an illustration of placing the shim frame.

In step e) of the instant invention, a first shim frame with matching alignment tooling holes is placed on top of the polymer sheet provided in step d). FIG. 5 illustrates such placing of the shim frame.

The shim frame allows for a predetermined compression of the polymer electrolyte membrane to be furnished later, because the material of the shim frame has only little compressibility and the thickness of the first shim frame/and the thickness of the both shim frames is as described before.

The shim frame may have openings on the sides which form a cavity into which any liquids which be present in the polymer electrolyte membrane and/or gas diffusion layer can be squeezed into during the later lamination. FIG. 5 illustrates such optional reservoirs in the shim frame.

Step f)

In step f) of the instant invention, a first gas diffusion layer being in contact with a catalyst layer is placed into the aperture formed by the shim frame provided in step e).

Figure 6:
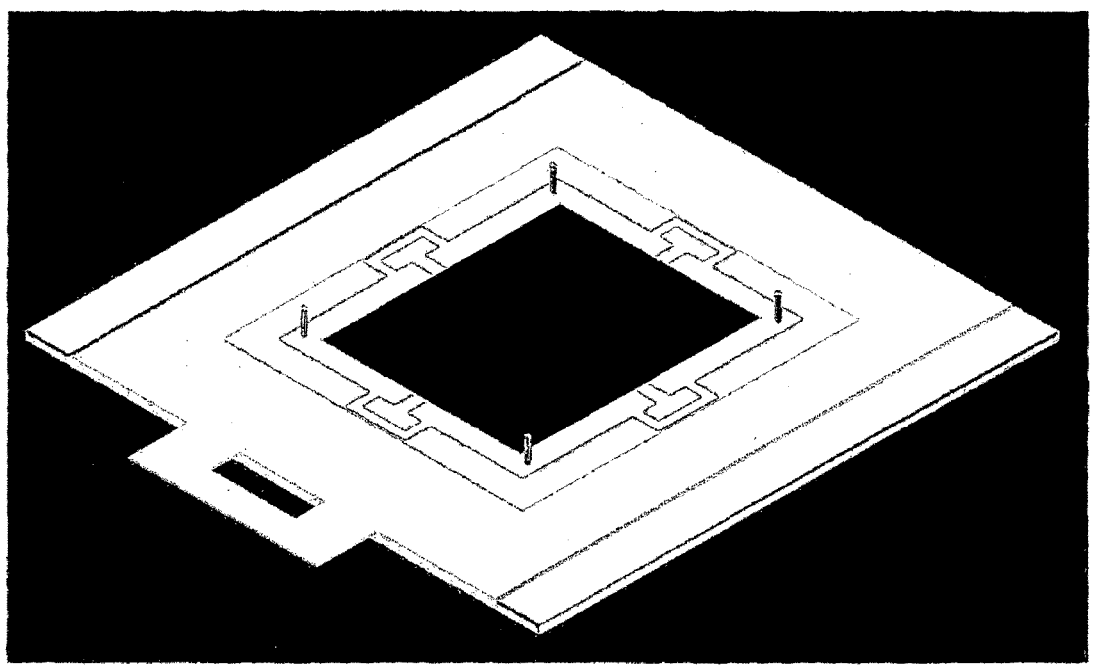
FIG. 6 is an illustration of placing the first gas diffusion layer.

The gas diffusion layer has the same size or a size being slightly smaller than the aperture size and form as the aforementioned aperture and the catalyst layer faces upwards. By slightly smaller size of the gas diffusion layer a maximum gap frame of up to 0.5 mm, preferably up to 0.25 mm, is created in step f). FIG. 6 illustrates such placing of the first gas diffusion layer.

Step g)

Figure 7:
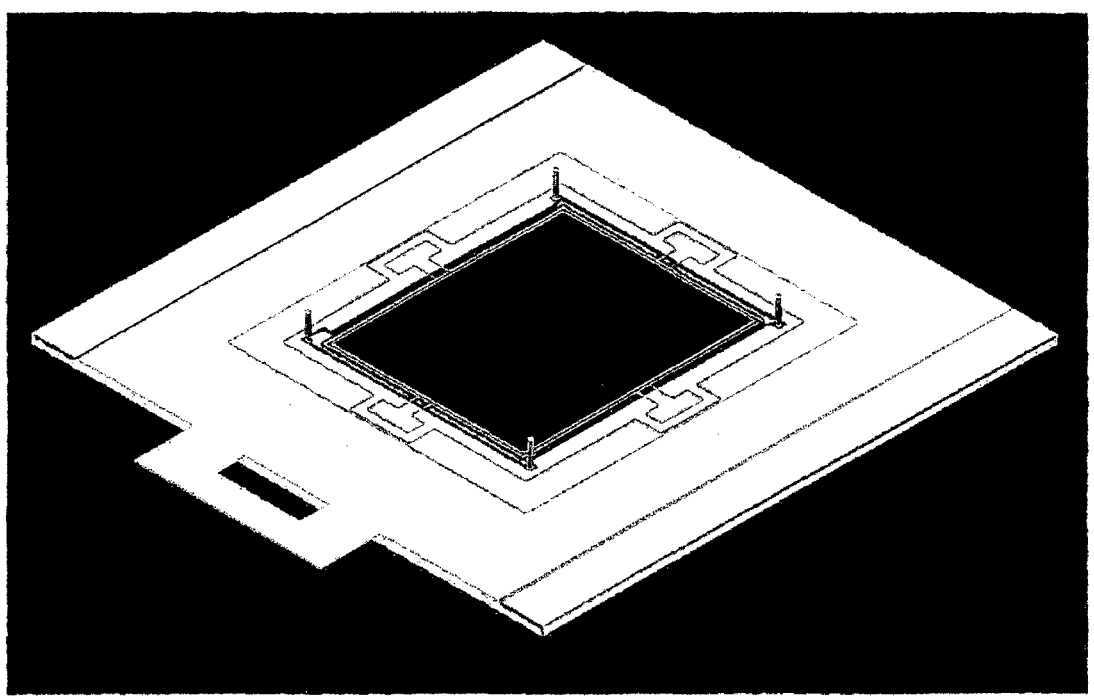
FIG. 7 is an illustration of placing the first polymer frame subgasket.

In step g) of the instant invention, a first polymer frame subgasket with matching alignment tooling holes is placed on top of the arrangement of step f). FIG. 7 illustrates such placing of the first polymer frame subgasket.

The polymer frame subgasket overlaps with the peripheral outer area of the gas diffusion layer/catalyst layer being and thereby creates an aperture which is smaller than the previous aperture formed by the shim frame. Typically, the overlap of the polymer frame subgasket and the peripheral outer area of the gas diffusion layer/catalyst layer is between 2 mm and 5 mm.

The polymer frame subgasket has an outer area extending outwards, typically between 2 mm and 100 mm, and not being provided with the surface of a gas diffusion layer or polymer electrolyte membrane to be furnished later. Typically, said outer area overlaps with the first shim frame between 2 mm and 100 mm.

Step h)

Figure 8:
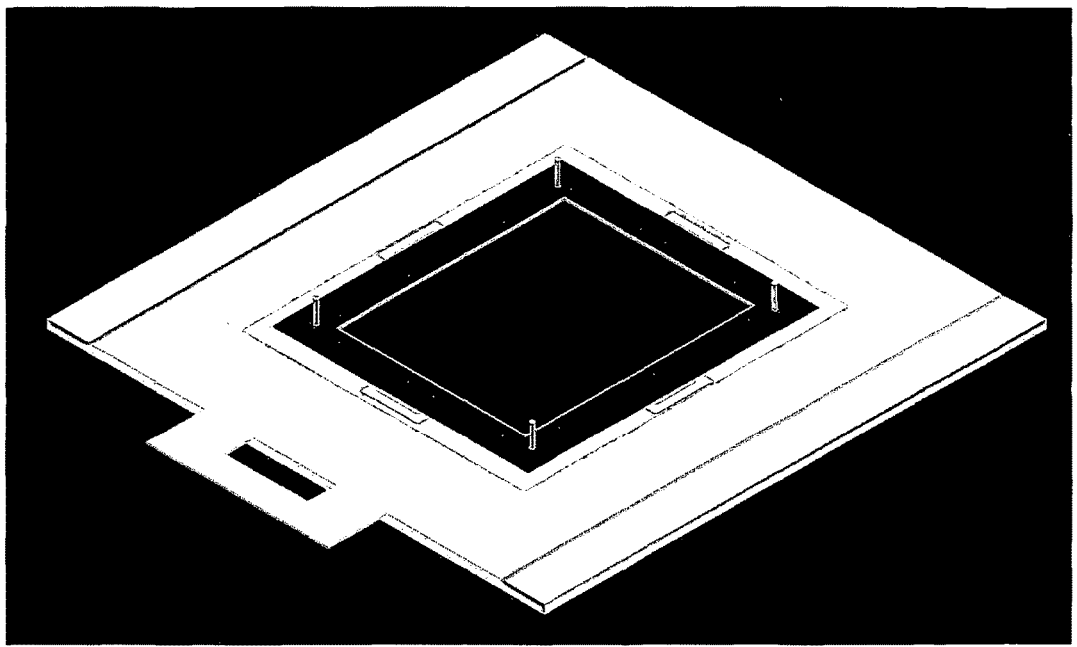
FIG. 8 is an illustration of placing the cutting plate.

In step h) of the instant invention, a cutting plate with matching alignment tooling holes is placed on top of the arrangement of step g). FIG. 8 illustrates such placing of the cutting plate.

Figure 8A:
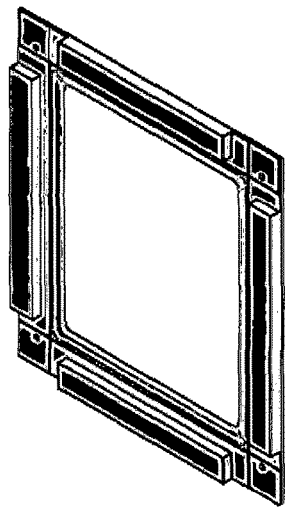
FIG. 8*a* is an illustration of a sample design of a cutting plate showing slots, hardstops and ramps.

The cutting plate has a frame shape and said frame having an aperture which is about 1 mm, preferably about 2 mm, smaller than the final size of the polymer electrolyte membrane being furnished later. Designs of the cutting plate can have included slots, a hard stop and a ramp to gradually bring the membrane up to the top surface of the cutting plate if it is thicker than 2 mm. A sample design of a cutting plate is shown in FIG. 8a) showing slots, hardstops and ramps.

Step i)

Figure 9:
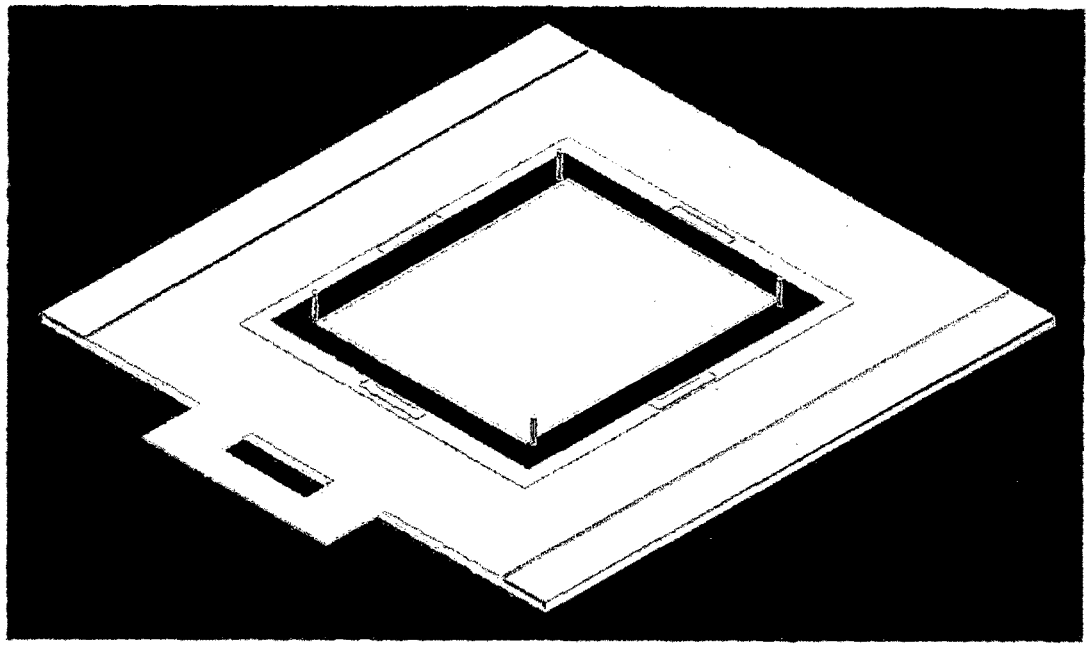
FIG. 9 is an illustration of placing the polymer electrolyte membrane.

In step i) of the instant invention, a polymer electrolyte membrane is placed over the aperture of the cutting frame, Typically, the membrane covering the entire aperture overlaps with the inner peripheral area of the aperture by at least about 1 mm, preferably at least about 2 mm. FIG. 9 illustrates such placing of the polymer electrolyte membrane.

Step j)

Figure 10:
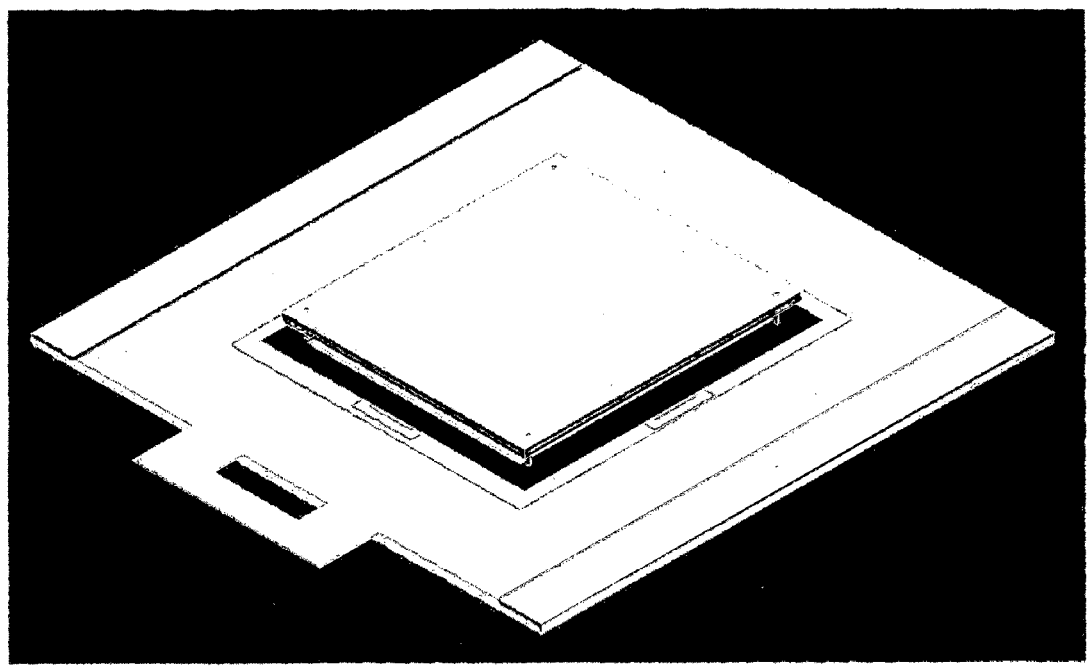
FIG. 10 is an illustration of placing the alignment cutting die.

In step j) of the instant invention, an alignment cutting die with matching alignment tooling holes is placed on top of the arrangement of step i). The cutting die has a circumferential cutting edge at the outer peripheral area of the cutting die. FIG. 10 illustrates such placing of the alignment cutting die.

Step k)

In step k) of the instant invention, the alignment cutting die is pressed against the cutting plate arrangement which is topped by the polymer electrolyte membrane to be cut. Typically, the pressure applied by the/onto the alignment cutting die is between 200 lbs and 1,500 lbs so that the cutting is performed or the membrane is fixed an cutting can be performed by manual means, e.g. a cutting knife.

The circumferential cutting edges of the cutting die cut the polymer electrolyte membrane into the desired shape and size. Since the polymer electrolyte membrane being placed over the aperture of the cutting plate is larger than the aperture and overlaps with the cutting plate by at least 1 mm, preferably by at least 2 mm. Thus, the area of the polymer electrolyte membrane extending outwards of the cutting die is cut and can be removed.

Step l)

Figure 11:
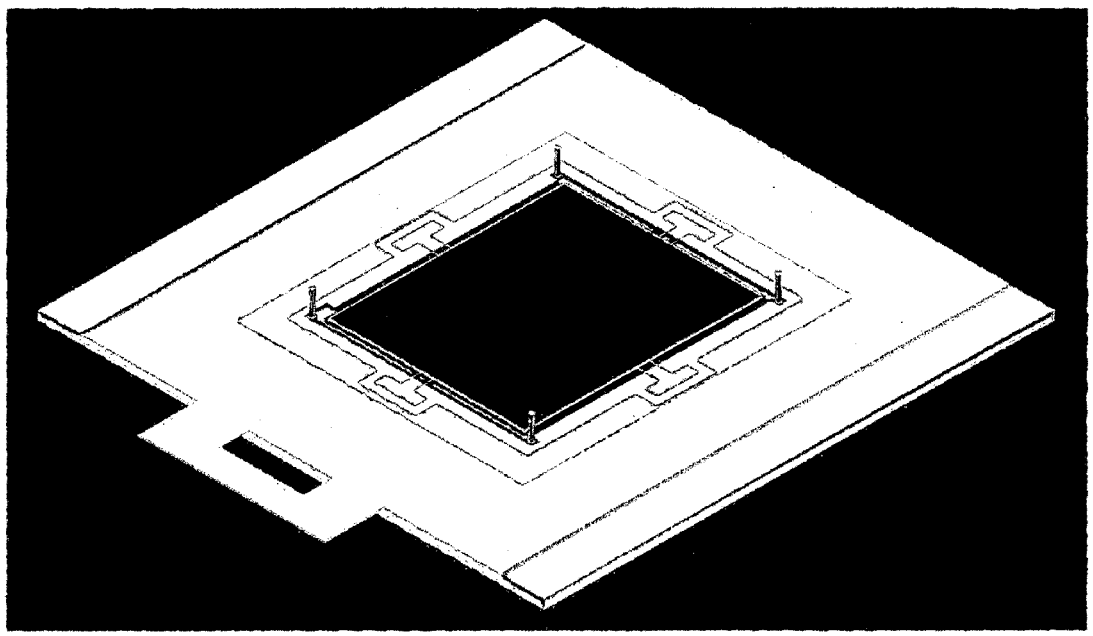
FIG. 11 is an illustration of removing the cutting plate.

In step l) of the instant invention, the cutting plate is removed, thus leaving the cut polymer electrolyte membrane overlapping with the inner peripheral area of the polymer frame subgasket. Typically, the overlap die is between 2 mm and 5 mm. FIG. 11 illustrates removing the cutting plate.

Step m)

Figure 12:
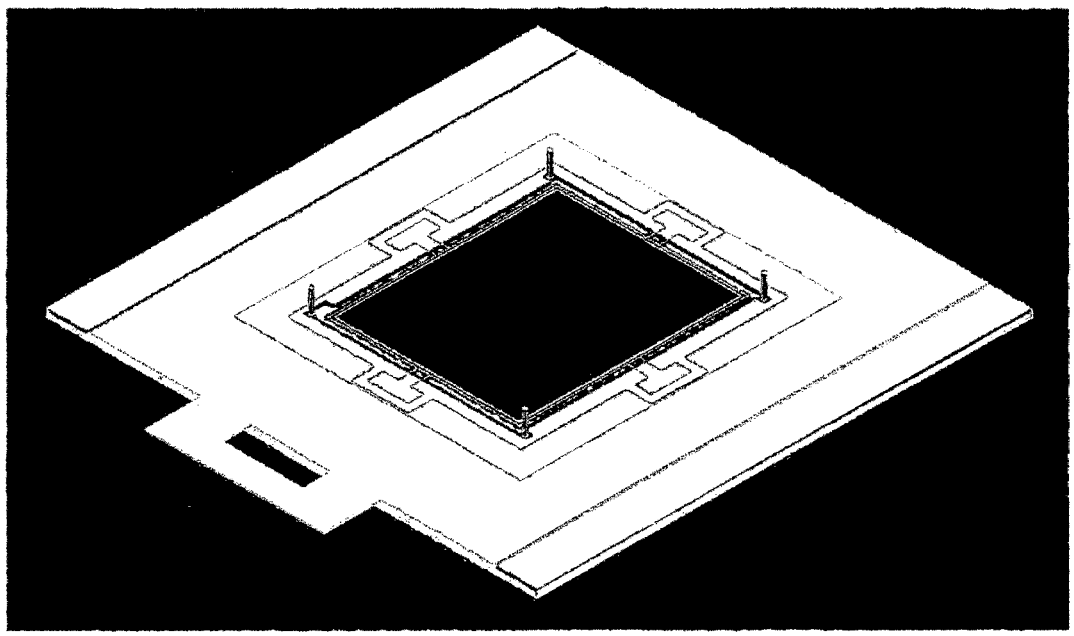
FIG. 12 is an illustration of placing the second polymer frame subgasket.

In step m) of the instant invention, a second polymer frame subgasket with matching alignment tooling holes is placed on top of the arrangement of step l). The inner peripheral area of the second polymer frame subgasket overlaps with the outer peripheral area of the polymer electrolyte membrane and thereby creates an aperture. Typically, the overlap of the polymer frame subgasket and the polymer electrolyte membrane is between 2 and 5 mm. FIG. 12 illustrates placing of the second polymer frame subgasket.

The second polymer frame subgasket has an outer area extending outwards, typically between 2 and 100 mm, and not being provided with the surface of a gas diffusion layer or polymer electrolyte membrane to be furnished later.

Step n)

Figure 13:
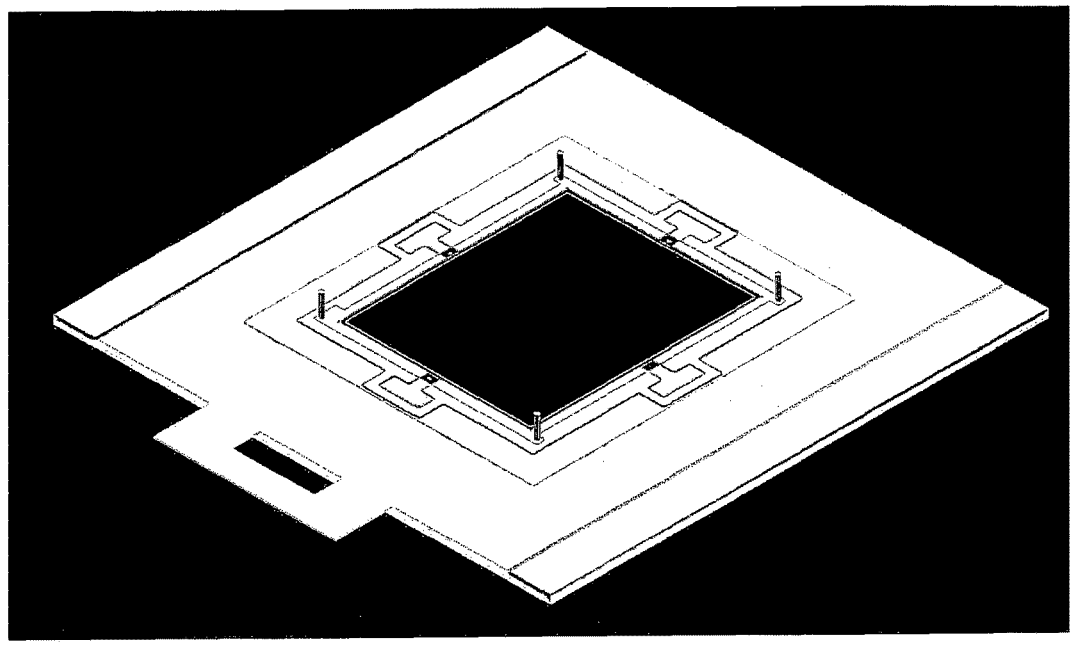
FIG. 13 is an illustration of the second shim frame with optional reservoirs in the shim frame.

In step n) of the instant invention, a second shim frame with matching alignment tooling holes is placed on top of the arrangement provided after step m). FIG. 13 illustrates such placing of the second shim frame.

The shim frame allows for a predetermined compression of the polymer electrolyte membrane, because the material of the shim frame has only lithe compressibility and the thickness of the first shim frame/and the thickness of the both shim frames is as described before.

Preferably both shim frames have the same design and are mode from the same material.

Figure 14:
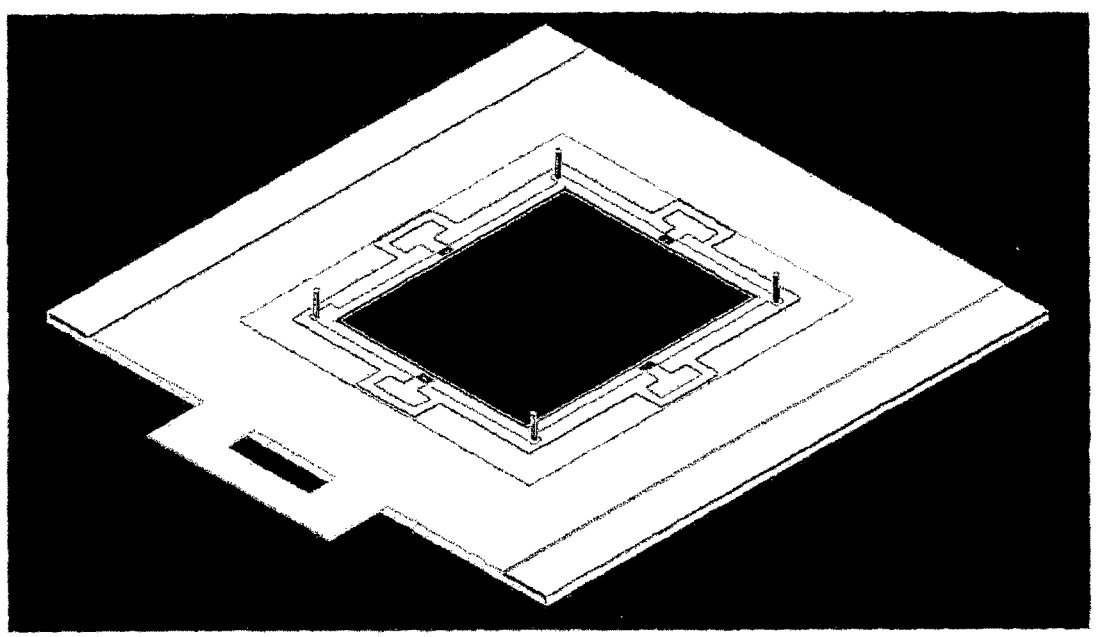
FIG. 14 is an illustration of placing the second gas diffusion layer.

As the first shim frame, the second shim frame may have openings on the sides which form a cavity into which any liquids which be present in the polymer electrolyte membrane and/or gas diffusion layer can be squeezed into during the later lamination. FIG. 14 illustrates such optional reservoirs in the shim frame.

Step o)

In step o) of the instant invention, a second gas diffusion layer being in contact with a catalyst layer is placed into the aperture formed by the shim frame provided in step n). The second gas diffusion layer having the same size or a size being slightly smaller than the aperture size and form as the aperture formed by the second shim frame and said catalyst layer facing downwards towards the polymer electrolyte membrane is placed.

By slightly smaller size of the gas diffusion layer a maximum gap frame of up to 0.5 mm, preferably up to 0.25 mm, is created in step o).

Figure 15:
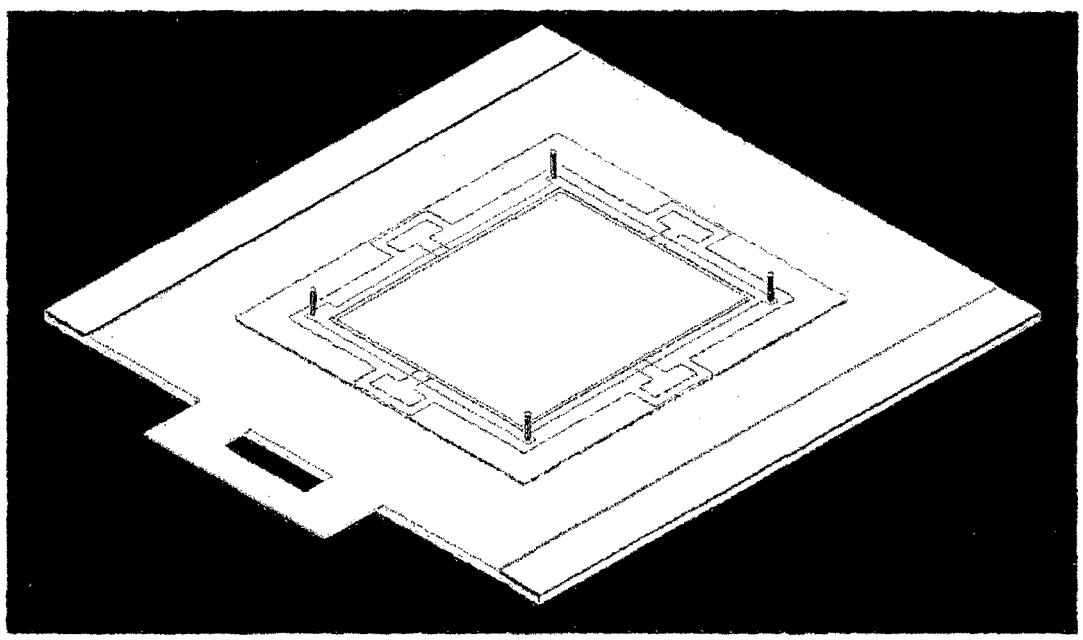
FIG. 15 is an illustration of placing the second polymer sheet.

FIG. 15 illustrates such placing of the second gas diffusion layer.

Step p)

In step p) of the instant invention, a second polymer sheet with matching alignment tooling holes is placed on top of the arrangement provided after step o).

The polymer sheet covers at least the entire area of the second gas diffusion layer later coming into contact with pressing plates during pressing in step r), except for the areas of the alignment tooling holes. For simplification the first polymer sheet and the second polymer sheet having the same size.

As the first polymer sheet can also be a part of the tray's surface coming into contact with the first gas diffusion layer, the second polymer sheet can be a part of the pressing plate surface. The second polymer sheet should be placed in such a manner that no wrinkles occur. FIG. 15 illustrates such placing of the second polymer sheet.

Step q)

In step q) of the instant invention, the alignment tooling pins are removed from the alignment tooling holes/deeping's, so that the arrangement is ready for pressing.

Step r)

In step r) of the instant invention, the arrangement form step q) is pressed.

In general, pressing is carried out at a temperature in the range of 10 to 300° C., in particular 100° C. to 200° C., preferably 120 to 200° C. The duration of the heat pressing is typically from seconds to minutes, most typically from 1 second to 300 seconds, in particular from 10 seconds to 300 seconds, at the aforementioned temperature ranges. The pressure applied is most typically from 0.25 MPa to 10 MPa, in particular from 0.5 MPa to 7.5 MPa, at the aforementioned temperature ranges and durations.

The pressing in step r) causes a controlled compression which is determined by (a) the total thickness of both, the shim frames and the subgaskets and (b) the total thickness of the gas diffusion electrodes and the polymer electrolyte membrane prior to any compression. Since the shim frame material itself has a defined compressibility which is a decreases in its thickness over a period of 5 hours, particularly preferably 10 hours, by not more than 5%, in particular not more than 2%, preferably not more than 1%, at a temperature of 120° C., particularly preferably 160° C., and a pressure of 10 N/mm², in particular 15 N/mm² and particularly preferably 20 N/mm², the compression is primarily determined by the aforementioned thicknesses (a) and (b).

In other words, the total thickness of both, the shim frames and the subgaskets is preferably set to amount to about 60% to about 95%, more preferred to about 60% to about 90%, most preferred about 70 to about 85%, of the total MEA thickness which is the total thickness of the gas diffusion electrodes and the polymer electrolyte membrane prior to any compression. This set up causes a compression of preferably about 40% to about 5%, more preferred about 40% to about 10%, most preferred about 30% to about 15%.

After cooling, the finished membrane electrode unit (MEU) is operational and can The FIGS. 1 to 17 describe the present invention, these figures intended to deepen the understanding of the present invention; however, this should not constitute a limitation.

General Test Methods:

Test Method for Ionic Conductivity

Ionic conductivities were measured via a four-probe through-plane bulk measurement using an AC Zahner IM6e impedance spectrometer that scanned a frequency range from 1 Hz to 100 KHz. A rectangular sample of membrane (3.5 cm×7.0 cm) was placed in a glass or polysulfone cell with four platinum wire current collectors. Two outer electrodes set 6.0 cm apart supplied current to the cell, while the two inner electrodes 2.0 cm apart on opposite sides of the membrane measured the voltage drop. To ensure a through-plane bulk measurement of the membrane ionic conductivity, the two outer electrodes are placed on opposite sides of the membrane and the two inner electrodes are arranged in the same manner. The reported conductivities were of preconditioned (dehydrated) membranes that were held at >100° C. for at least two hours. Proton conductivity was calculated using the following equation:

$$\sigma = D/(L*B*R)$$

Where D was the distance between the two test current electrodes, L was the thickness of the membrane, B was the width of the membrane, and R was the measured resistance. The membrane contains no additional proton-conducting fillers.

Test Method for Fuel Cell Performance

Fuel cell performance was measured in 50 cm² (active area 45.15 cm²) single stack fuel cells using test stations obtained from Plug Power or purchased from Fuel Cell Technologies. Polarization curves were obtained at various temperatures (120-180° C.) with hydrogen as a fuel and different oxidants (air or oxygen gas). Fuel cells were operated for at least 100 hours (break-in period) at 0.2 A/cm² at 180° C. before measurement of polarization curves. Long term stability testing was performed under static current and temperature conditions of 0.2 A/cm² and 180° C. with a constant flow rate of hydrogen (1.2 stoichiometric ratio) and air (2.0 stoichiometric ratio).

Test Method for Inherent Viscosity

The inherent viscosity, also referred to as intrinsic viscosity, was measured by placing a small amount of pulverized polymer (washed with distilled water until neutral to remove any mineral acids and dried for 12 hours at 120-130° C.). Solutions for inherent viscosity measurement were prepared by dissolving the neutralized polymer in concentrated sulfuric acid (96%) at a concentration of 0.2 g/dL. Inherent viscosity was measured by recording the flow times in the viscometer for the polymer solution and pure sulfuric acid using a suspended level Ubbelohde viscometer, size 200, at 30.0° C. in a temperature controlled water bath and was calculated according to the following equation:

$$\ln(t/t_o)/c = \text{inherent viscosity (dL/g)}$$

t (sec): solution flow time $t_o$ (sec): solvent flow time (96% sulfuric acid)

c (g/dL): solution concentration

Test Method for Titration

The composition of the membrane was determined by titration with 0.1 M sodium hydroxide. The 0.1 M sodium hydroxide solution was prepared by dissolving 4 g sodium hydroxide in 1 liter distilled water and standardized by titration with a known amount of potassium hydrogen phthalate (predried at 110° C. for 1 hour). At least three circular samples with a diameter of 2 cm were cut from the bulk membrane. Every sample was weighed to obtain the initial weight, and then placed in 20 mL of distilled water and allowed to stir for at least 30 minutes. The samples were titrated using a Metrohm 716 DMS Titrino titrator. The first equivalence point was used to determine the volume of sodium hydroxide necessary for neutralization. The samples were washed thoroughly with distilled water and dried in a vacuum oven at 110° C. for at least eight hours. The samples were allowed to cool to room temperature in the vacuum oven before removal and were weighed to obtain the dry weight of the polymer.

Phosphoric acid doping levels, X, moles of phosphoric acid per mole of PBI repeat unit (X $H_3PO_4$/PBI) were calculated from the equation:

$$X = \frac{(V_{NaOH} \times C_{NaOH})}{(W_{dry} / M_{polymer})}$$

where $V_{NaOH}$ and $C_{NaOH}$ are the volume and concentration of the sodium hydroxide solution required to neutralize the phosphoric acid to the first equivalence point, $W_{dry}$ is the dry weights of the polymer sample, and $M_{polymer}$ is the molecular weights of the polymer repeat unit.

The polymer weight percentage, phosphoric acid weight percentage, water weight percentage, and the concentration of phosphoric acid of the tested membranes were determined by the equations below:

$$\text{polymer } \% = \frac{W_{dry}}{W_{sample}} \times 100$$

$$\text{acid } \% = \frac{M_{acid} \times V_{NaOH} \times C_{NaOH}}{W_{sample}} \times 100$$

$$\text{water } \% = \frac{W_{sample} - W_{dry} - M_{acid} \times V_{NaOH} \times C_{NaOH}}{W_{sample}} \times 100$$

$$\text{Concentration}_{acid} \% = \frac{W_{acid}}{W_{acid} + W_{H_2O}} \times 100 = \frac{M_{acid} \times V_{NaOH} \times C_{NaOH}}{W_{sample} - W_{dry}} \times 100$$

where $V_{NaOH}$ and $C_{NaOH}$ are the volume and concentration of the sodium hydroxide solution required to neutralize the phosphoric acid to the first equivalence point, $M_{acid}$ is the molecular weights of phosphoric acid, $W_{dry}$ is the dry weight of the polymer sample, and $W_{sample}$ is the total weight of the testing sample.

The thickness of the layers is determined with a digital thickness tester from the company Mitutoyo. The initial pressure of the two circular flat contact surfaces during measurement is 1 PSI, the diameter of the contact surface is 1 cm.

EXAMPLE

Two commercially available gas diffusion electrodes produced according to patent application U.S. Pat. No. 6,103,077 are used whereby the anode contains a platinum on carbon catalyst and the cathode contains a platinum alloy on carbon catalyst.

A proton-conducting membrane produced according to the patent application EP-A-1,379,573 is used.

A first polymer frame gasket made of PFA with a thickness of 400 μm.

The cut-out (aperture) of the first polymer frame gasket has a size of 279 mm×233 mm so that the clearance of the frame and the electrode is 0.5 mm on each side.

A second polymer frame gasket made of PFA with a thickness of 250 μm.

The cut-out (aperture) of the second polymer frame gasket has a size of 274 mm×228 mm so that the overlapping of the frame and the electrode is 2 mm on each side. The active electrode surface remains 605 cm².

Shims and frame gasket described above are same part. A®Kapton sheet on top and bottom of MEU is to protect tray and platens from any acid that may come out. Thickness is typically 40 μm for ®Kapton sheets.

The arrangement is placed in a press (Toni Technik, 500 mm×600 mm, Titanium tray is placed onto Steel platens, added below) compressed with each other under defined pressure (~4 Mpa based on shim/template combo frame area) and duration (30 seconds) at a temperature of 140° C.

Figure 16:
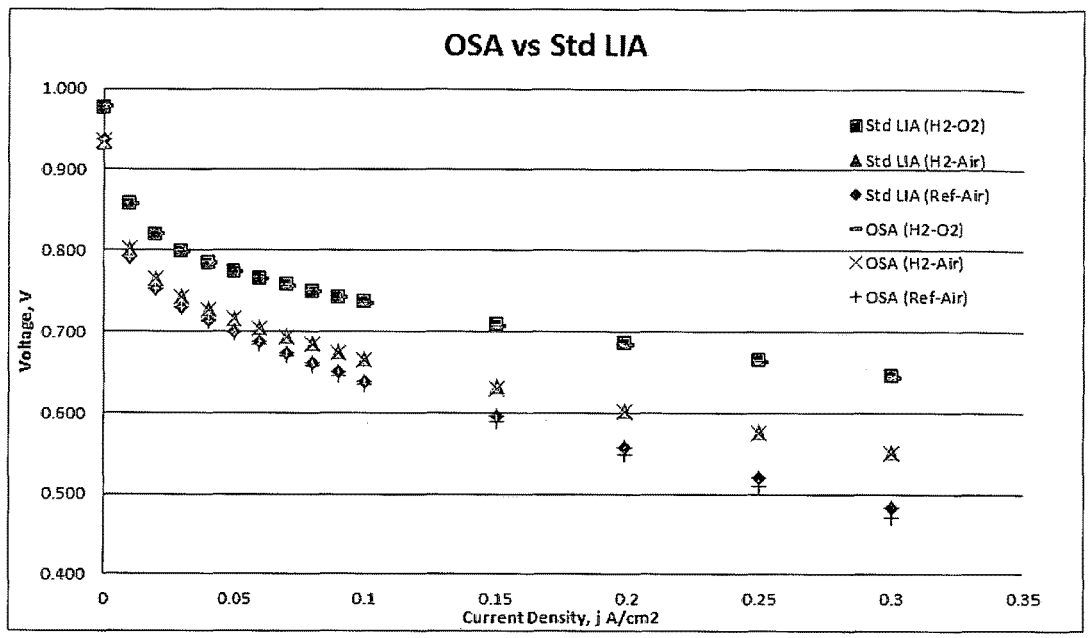
FIG. 16 is a graph comparing the test results of the new One Shot Assembly and a standard Labor Intensive Assembly method.

The MEU thus obtained is measured into a standard fuel cell with graphite flow magnetoresistors. In the process, the following measuring conditions are observed: T=180° C., p=1 bar, unmoistened gases H2 (stochiometry 1.2) and air (stochiometry 2) The performance of this MEU is shown in FIG. 16, which shows the results for 605 cm² MEAs prepared with new One Shot Assembly (OSA) method and traditional Labor Intensive Assembly (LIA) method. One Shot Assembly (OSA) is the name given to the procedure being patented. Standard Labor Intensive Assembly (Std LIA) is the name of the traditional assembly method which OSA will be replacing. FIG. 16 shows the performance of three different fuel cell tests for MEAs prepared by OSA and Std LIA methods. It can be seen that the performance is nearly identical between OSA and Std LIA MEAs.

Figure 17:
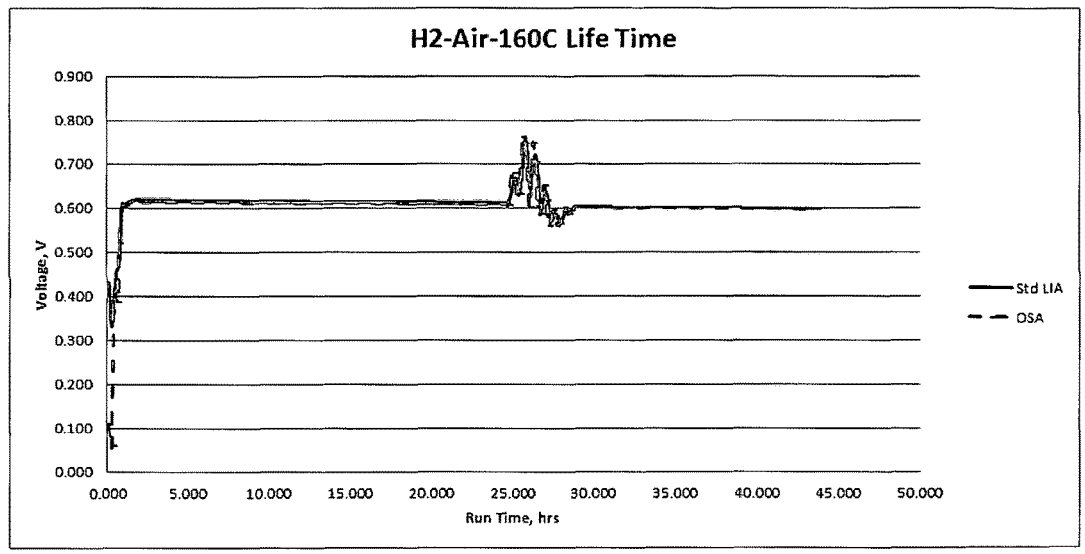
FIG. 17 is a graph showing the performance of an MEA prepared with the One Shot Assembly method according to the invention and a standard LIA method.

FIG. 17 shows the performance of an MEA prepared with One Shot Assembly (OSA) method according to the invention and an MEA prepared with Std LIA method. The performance is nearly identical for the duration of the test.

The results in FIG. 16 and FIG. 17 show that OSA does not adversely affect performance of the fuel cell.

The invention claimed is:
1. A process for the manufacture of a membrane electrode unit (MEU) having
  (i) two gas diffusion layers that are each in contact with a catalyst layer and being separated by a polymer electrolyte membrane,
  (ii) both surfaces of the polymer electrolyte membrane that is in contact with a catalyst layer are provided each with a polymer frame, each of said polymer frames having an inner area which is provided on the surfaces of the polymer electrolyte membrane, and an outer area which extends outwards and which is not provided on the surface of a gas diffusion layer,
comprising the following steps
  a) placing a base on which the manufacture is performed, said base having holes for placing an alignment tooling and said holes being arranged at least at the peripheral edges of the MEU being manufactured,
  b) placing a tray with matching alignment tooling holes on top of the base provided in step a),
  c) placing pins as alignment tooling in the alignment tooling holes, said pins insert through the holes of the tray into the base, said pins protrude rectangular of the base and tray,
  d) placing a first polymer sheet with matching alignment tooling holes on top of the tray, said polymer sheet covering at least the entire area of the tray otherwise coming into contact with the two gas diffusion layer furnished later,
  e) placing a first shim frame with matching alignment tooling holes on top of the polymer sheet provided in step d),
  f) placing a first gas diffusion layer being in contact with a catalyst layer into the aperture formed by the shim frame provided in step e), said gas diffusion layer having the same size or a size being slightly smaller than the aperture size and form as the aperture and said catalyst layer facing upwards, g) placing a first polymer frame subgasket with matching alignment tooling holes on top of the arrangement of step f), said polymer frame subgasket overlapping with the peripheral area of the gas diffusion layer/catalyst layer being and thereby creating an aperture being smaller that the aperture formed by the shim frame, said polymer frame subgasket having an outer area extending outwards and not being provided with the surface of a gas diffusion layer or polymer electrolyte membrane to be furnished later, h) placing a cutting plate with matching alignment tooling holes on top of the arrangement of step g), said cutting plate having a frame shape and said frame having an aperture which is at least about 1 mm smaller than the size of the polymer electrolyte membrane to be furnished subsequently, i) placing the polymer electrolyte membrane over the aperture of the cutting frame, said membrane covering the entire aperture and overlapping the peripheral area of the aperture by at least about 1 mm, j) placing an alignment cutting die with matching alignment tooling holes on top of the arrangement of step i), said cutting die having a cutting die at the peripheral area, k) pressing the alignment cutting towards the polymer electrolyte membrane and cutting off thereby the area of the polymer electrolyte membrane extending outwards of the cutting die and removing the alignment cutting and polymer electrolyte membrane scrap, l) removing the cutting plate and leaving the cut polymer electrolyte membrane overlapping with the peripheral area of the polymer frame subgasket, m) placing a second polymer frame subgasket with matching alignment tooling holes on top of the arrangement of step l), said second polymer frame subgasket overlapping with the peripheral area of the polymer electrolyte membrane and thereby creating an aperture, said second polymer frame subgasket having an outer area extending outwards and not being provided with the surface of a second gas diffusion layer to be furnished later or polymer electrolyte membrane, n) placing a second shim frame with matching alignment tooling holes, said second shim frame overlaps with the peripheral area of the subgasket, leaving an inner area to which the gas diffusion layer will be bonded, preferably said overlap being about 1 mm to about 5 mm, o) placing a second gas diffusion layer being in contact with a catalyst layer into the aperture formed by the shim frame provided in step n), said gas diffusion layer having the same size or a size being slightly smaller than the aperture size and form as the aperture and said catalyst layer facing downwards towards the polymer electrolyte membrane, p) placing a second polymer sheet with matching alignment tooling holes on top of the tray, said polymer sheet covering at least the entire area of the second gas diffusion layer furnished in step o), q) removing the alignment tooling pins placed in step c) from the alignment tooling holes, r) pressing the arrangement from step q).

2. The process of claim 1, wherein the polymer electrolyte membrane comprises an alkaline polymer with at least one nitrogen atom per polymer repeating unit.

3. The process of claim 1, wherein the polymer electrolyte membrane comprises an alkaline polymer having an aromatic ring with at least one nitrogen atom per polymer repeating unit.

4. The process of claim 1, wherein the polymer electrolyte membrane comprises an alkaline polymer based on polyazole contains recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

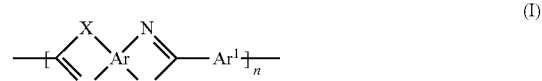

(I)

(II)

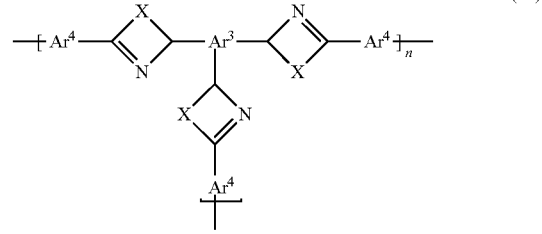

(III)

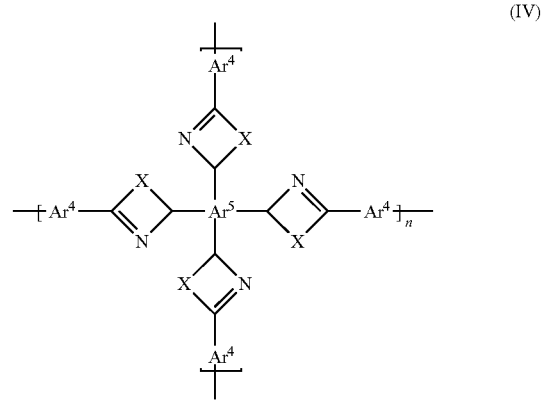

(IV)

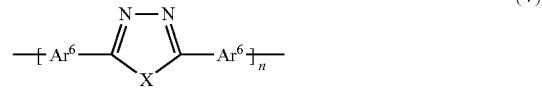

(V)

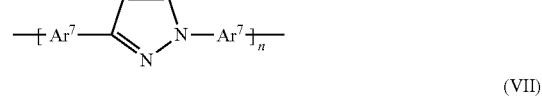

(VI)

(VII)

(VIII)

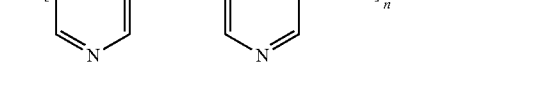

(IX)

-continued

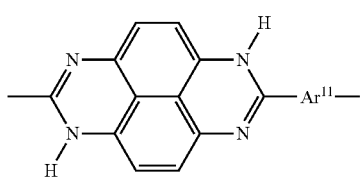 (X)

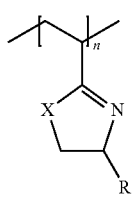 (XI)

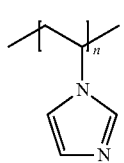 (XII)

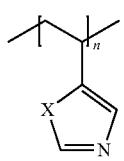 (XIII)

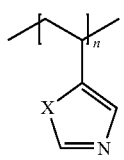 (XIII)

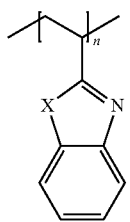 (XIV)

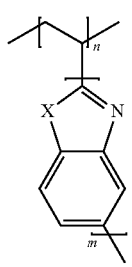 (XV)

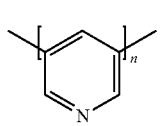 (XVI)

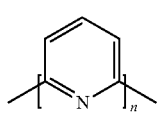 (XVII)

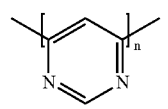 (XVIII)

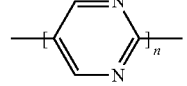 (XIX)

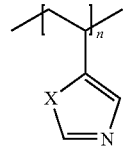 (XIII)

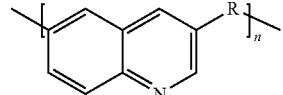 (XX)

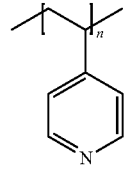 (XXI)

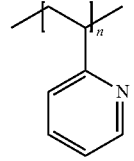 (XXII)

in which

Ar are the same or different and are each a tetravalent aromatic or heteroaromatic group which may be mono- or polycyclic, $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, Ar¹⁰ are the same or different and are each a di- or trivalent aromatic or heteroaromatic group which may be mono- or polycyclic, Ar¹¹ are the same or different and are each a divalent aromatic or heteroaromatic group which may be mono- or polycyclic, X are the same or different and are each oxygen, sulfur or an amino group which bears a hydrogen atom, a group having 1-20 carbon atoms, R is the same or different and is hydrogen, an alkyl group or an aromatic group, with the proviso that R in formula (XX) is not hydrogen, and n, m are each an integer greater than or equal to 10.

5. The process of claim 1, wherein the polymer electrolyte membrane comprises Lewis- and Bransted acids, wherein the acids may be covalently bound to the polymers or imbibed and coordinated through acid-base interaction with the polymer forming the membrane.

6. The process of claim 5, wherein the Lewis- and Bransted acids are inorganic Lewis- and Bransted acids.

7. The process of claim 1, wherein the polymer electrolyte membrane has a proton conductivity of at least 100 mS/cm, measured at temperatures of 120° C. without moistening.

8. The process of claim 1, wherein the polymer electrolyte membrane placed in step i) has a thickness from 50 to 1,000 μm.

9. The process of claim 1, wherein the gas diffusion layers placed in step f) and o) have a thickness in the range of from 80 μm to 2000 μm.

10. The process of claim 1, wherein the catalyst layer being on contact with the gas diffusion layers have a thickness in the range of 1 to 1000 μm.

11. The process of claim 10, wherein the catalyst layer contain 0.1 to 10.0 mg/cm² of precious metals.

12. The process of claim 10, wherein the thickness of the gas diffusion layer having a catalyst layer placed in step f) and o) is from 100 to 700 μm.

13. The process of claim 1, wherein the thickness of the polymer frame subgasket placed in step g) and m) is from 20 to 300 μm.

14. The process of claim 1, wherein the polymer frame subgasket overlaps with the peripheral area of the gas diffusion layer/catalyst layer, said overlap being preferably at least 1 mm.

15. The process of claim 1, wherein the polymer frame subgasket is made from polymer materials which exhibit a long-term service temperature of at least 160° C. measured in accordance with MIL-P-46112B, paragraph 4.4.5.

16. The process of claim 1, wherein the polymer frame subgasket is a film having a tensile strength of at least 6 N/mm², preferably at least 7 N/mm², measured at 80° C. measured in accordance with DIN EN ISO 527-1.

17. The process of claim 1, wherein the base has at least 4 alignment tooling and 4 holes for placing the alignment tooling for a quadrangular MEU.

18. The process of claim 1, wherein the base has alignment tooling pins which move up for use and down and away for pressing the assembly through holes in the base.

19. The process of claim 1, wherein the alignment tooling protrude about 25 mm to about 50 mm above the surface of the base on which the items are placed.

20. The process of claim 1, wherein the tray has a thickness of about 1 mm to 1.5 mm.

21. The process of claim 1, wherein the polymer sheet is a film having a tensile strength of at least 6 N/mm² measured at 80° C., and an elongation of 100%, measured in accordance with DIN EN ISO 527-1.

22. The process of claim 1, wherein the polymer sheet placed in step d) and p) is a film having a thickness of 25 to 75 μm.

23. The process of claim 1, wherein the shim frame used and placed in step e) and n) has a thickness of 150 μm to 350 μm.

24. The process of claim 1, wherein the shim frame used and placed in step e) and n) frame decreases in its thickness over a period of 5 hours, by not more than 5%, at a temperature of 120° C., and a pressure of 10 N/mm².

25. The process of claim 1, wherein the total thickness of the shim frames is less than the thickness of the polymer electrolyte membrane, preferably by at least 5%.

26. The process of claim 1, wherein the alignment tooling's is placed in step a) instead of in step c).

27. The process of claim 1, wherein the first polymer sheet is a part of the tray's surface coming into contact with the gas diffusion layer furnished lateron.

28. The process of claim 1, wherein the first gas diffusion layer in step f) has a size being slightly smaller than the aperture size and form so that a maximum gap frame of up to 0.5 mm is created in step f).

29. The process of claim 1, wherein the polymer frame subgasket in step g) overlaps with the peripheral outer area of the gas diffusion layer/catalyst layer being and thereby creates an aperture which is smaller than the previous aperture formed by the shim frame, preferably the overlap of the polymer frame subgasket and the peripheral outer area of the gas diffusion layer/catalyst layer is between 2 mm and 5 mm.

30. The process of claim 1, wherein polymer electrolyte membrane in step l) overlaps with the inner peripheral area of the polymer frame subgasket by 2 mm to 5 mm.

31. The process of claim 1, wherein in step m) the inner peripheral area of the second polymer frame subgasket overlaps with the outer peripheral area of the polymer electrolyte membrane and thereby creates an aperture, preferably the overlap of the polymer frame subgasket and the polymer electrolyte membrane is between 2 and 5 mm.

32. The process of claim 1, wherein the second gas diffusion layer in step o) has a size being slightly smaller than the aperture size formed by the shim frame provided in step n) so that a maximum gap frame of up to 0.5 mm.

33. The process of claim 1, wherein the pressing in step r) is carried out at a temperature in the range of 10 to 300° C.

34. The process of claim 1, wherein the pressure applied in step r) is from 0.25 MPa to 10 MPa.

35. The process of claim 1, wherein the total thickness of both, the shim frames and the subgaskets is set to amount to about 60% to about 95% of the total MEA thickness which is the total thickness of the gas diffusion electrodes and the polymer electrolyte membrane prior to any compression.

* * * * *